United States Patent
Buoni

(10) Patent No.: US 9,529,125 B2
(45) Date of Patent: Dec. 27, 2016

(54) METALIZED MICROPRISMATIC RETROREFLECTIVE SHEETING WITH IMPROVED OBSERVATION ANGULARITY

(71) Applicant: Aura Optical Systems, LP, Fort Worth, TX (US)

(72) Inventor: Drew J Buoni, North Richland Hills, TX (US)

(73) Assignee: Aura Optical Systems, LP, Fort Worth, TX (US)

(*) Notice: Subject to any disclaimer, the term of this patent is extended or adjusted under 35 U.S.C. 154(b) by 10 days.

(21) Appl. No.: 14/761,522

(22) PCT Filed: Jan. 27, 2014

(86) PCT No.: PCT/US2014/013193
§ 371 (c)(1),
(2) Date: Jul. 16, 2015

(87) PCT Pub. No.: WO2014/117086
PCT Pub. Date: Jul. 31, 2014

(65) Prior Publication Data
US 2015/0362640 A1 Dec. 17, 2015

Related U.S. Application Data

(60) Provisional application No. 61/757,385, filed on Jan. 28, 2013.

(51) Int. Cl.
*G02B 5/124* (2006.01)
*G02B 5/02* (2006.01)

(52) U.S. Cl.
CPC .......... *G02B 5/124* (2013.01); *G02B 5/0231* (2013.01); *G02B 5/0284* (2013.01); *Y10T 156/10* (2015.01)

(58) Field of Classification Search
CPC ..... G02B 5/124; G02B 5/0284; G02B 5/0231; Y10T 156/10
USPC .................................. 359/529–530, 834, 836
See application file for complete search history.

(56) References Cited

U.S. PATENT DOCUMENTS

| | | | |
|---|---|---|---|
| 5,706,132 A | 1/1998 | Nestegard et al. | |
| 5,764,413 A | 6/1998 | Smith et al. | |
| 5,812,315 A | 9/1998 | Smith et al. | |
| 5,936,770 A | 8/1999 | Nestegard et al. | |
| 6,457,835 B1 | 10/2002 | Nilsen et al. | |
| 6,877,866 B2 | 4/2005 | Nilsen et al. | |
| 7,445,347 B2 | 11/2008 | Couzin | |
| 2004/0174602 A1* | 9/2004 | Smith | B29D 11/00605 359/530 |

FOREIGN PATENT DOCUMENTS

| | | |
|---|---|---|
| EP | 1965232 A1 | 9/2008 |
| WO | 9610197 A1 | 4/1996 |

(Continued)

*Primary Examiner* — James Phan
(74) *Attorney, Agent, or Firm* — Parker Justiss, P.C.

(57) ABSTRACT

One aspect of the present disclosure provides microprismatic retroreflective film that includes a substrate and metalized microprisms located on the substrate. At least a portion of the metalized microprisms are forward-tilted microprisms, and at least a portion of the forward-tilted microprisms are aligned with the plane of optical axis tilting aligned at an angle ranging from about 10 to 80 degrees with an edge of the microprismatic retroreflective film.

19 Claims, 15 Drawing Sheets

(56) References Cited

FOREIGN PATENT DOCUMENTS

| WO | 9642025 | A1 | 12/1996 |
| WO | 9741462 | A1 | 11/1997 |
| WO | 2014117086 | A1 | 7/2014 |

* cited by examiner

METALIZED MICROPRISMATIC RETROREFLECTIVE SHEETING WITH IMPROVED OBSERVATION ANGULARITY

CROSS-REFERENCE TO RELATED APPLICATION

This application is the National Stage of, and therefore claims the benefit of, International Application No. PCT/US2014/013193 filed on Jan. 27, 2014, entitled "METALIZED MICROPRISMATIC RETROREFLECTIVE SHEETING WITH IMPROVED OBSERVATION ANGULARITY," which was published in English under International Publication Number WO 2014/117086 on Jul. 31, 2014. International Application No. PCT/US2014/013193 claims priority to U.S. Provisional Application No. 61/757,385 filed on Jan. 28, 2013. Both of the above applications are commonly assigned with this National Stage application and are incorporated herein by reference in their entirety.

TECHNICAL FIELD

This application is directed to a metalized microprismatic film material having improved observation angularity.

BACKGROUND

As is known in the art, microprismatic retroreflective film generally consists of a plastic film containing many microscopic cube corner retroreflective elements (also known as either microprismatic retroreflective elements or microprisms). These retroreflective elements are generally a trihedral structure having three mutually substantially perpendicular lateral faces. The three lateral faces intersect at a single point, or apex, which is opposite of a base triangle, which outlines the base of the trihedral. The optical axis of a cube corner element is defined as the axis which extends from the apex of the cube corner retroreflector to trisect the base triangle. These cube corner retroreflective elements operate to return impinging light towards its source. Light will enter each cube corner retroreflective element through the base triangle and will then be reflected from each of the three lateral faces to return towards its source.

Reflection from the three lateral faces occurs either through specular reflection or total internal reflection. With specular reflection, the cube corner retroreflective elements are coated with a reflective material, such as either aluminum or silver, as is the case with metalized microprismatic retroreflective sheeting. With total internal reflection, the cube corner retroreflective elements are not coated with a reflective material, but instead are governed by Snell's Law where any light impinging on one of the lateral faces will pass through the face unless it strikes the face at an angle less than its critical angle, in which case the light will be reflected.

There are four main classifications of microprisms, depending upon how the optical axis is positioned relative to one or more of the lateral faces of the microprisms. These four categories are equilateral microprisms, forward-tilted microprisms, backward-tilted microprisms, and scalene microprisms. A more detailed discussion of these classifications is provided below.

In practice, microprismatic retroreflective elements are interconnected in arrays of microprismatic elements throughout a roll of retroreflective sheeting. There are thousands of individual microprisms per a square-inch of sheeting, and all of these retroreflective elements function together to provide the overall retroreflective performance properties of the sheeting. Further, as known in the art, the microprisms within these arrays generally occur in matched pairs, which is a by-product of how microprisms are often designed and manufactured.

There are many applications for retroreflective sheeting, including traffic signs, vehicle number plates, contour marking tape for trucks and other heavy vehicles, reflective vehicle graphics, construction work zone barricades or delineators, safety vests, railroad crossings, and many other applications. In many of these applications, the retroreflective sheeting is aligned either in a vertical or horizontal position. For example, contour markings on a heavy truck trailer are typically applied horizontally along the sides of a trailer. Similarly, reflective sheeting is often applied to several horizontal boards to create a construction work zone barricade. Further, school buses often have retroreflective tape outlining the perimeter of emergency exits.

The performance of retroreflective sheeting is largely characterized by two retroreflective performance parameters: entrance angularity and observation angularity. Entrance angle is defined as the angle at which light impinges on the surface of the retroreflective sheeting. A zero degree entrance angle is perpendicular to the face of the sheeting. In most instances, the retroreflective properties of microprismatic retroreflective sheeting are greatest at small entrance angles and decrease as the entrance angle increases.

Observation angle is defined as the angle between the source light and the detector as light strikes the face of the retroreflective sheeting and is retroreflected back towards the source. For example, for a truck, the observation angle is the angle between the truck's headlight (the light source), the retroreflective object (such as a traffic sign), and the truck driver's eye (the detector). Observation angles are typically quite small, between 0.1 and 2.0 degrees. For example, when a retroreflective traffic sign is viewed from about 700 feet from an automobile, an observation angle of about 0.2 degrees occurs. Generally speaking, the closer the source light (such as a vehicle's headlight) is to the retroreflective object, the larger the observation angle. Similarly, larger observation angles will exist when a retroreflective object is viewed from a heavy truck instead of a small car because the truck driver is typically further elevated above the truck's headlights, and therefore, larger angles exist between the driver's eyes and the headlights.

Hoopman, U.S. Pat. No. 4,588,258 and Szczech, U.S. Pat. No. 5,138,488 both teach how improved entrance angularity can be achieved in both a horizontal and vertical plane by incorporating forward-tilted microprisms into the sheeting. However, the improved entrance angularity between the horizontal and vertical planes is not symmetrical.

Nestegard et al, U.S. Pat. Nos. 5,706,132 and 5,936,770 teach how tiling can be used to balance the improved entrance angularity of forward-tilted prisms by creating at least two different arrays of microprisms arranged perpendicular to each other.

Smith et al, U.S. Pat. No. 5,764,413 outlines the principles of tiling for backward-tilted microprisms to optimize the entrance angle performance in both vertical and horizontal planes.

Smith et al, U.S. Pat. Nos. 5,812,315 and 5,822,121 teach how entrance angularity can be improved in both vertical and horizontal planes by rotating either backwards-tilted or scalene microprisms with respect to the edge of the sheeting.

Nilsen et al, U.S. Pat. Nos. 6,036,322, 6,457,835, and 6,877,866 teach how a more uniform distribution of light can be achieved through tiling of four arrays of microprisms at 0°, 90°, 180° and 270°, especially for backward-tilted prisms.

Appeldorn et al, U.S. Pat. No. 4,775,219 and Couzin et al, U.S. Pat. No. 6,984,047 both teach how to improve observation angularity by intentionally creating dihedral angle ruling errors.

As mentioned above, there are generally two different product constructions for microprismatic retroreflective sheeting available in the market. The first construction is encapsulated microprismatic sheeting, where the cube corner retroreflective elements are encapsulated within a cellular structure. With this construction, the microprismatic elements operate by the principles of total internal reflection. The second construction is metalized microprismatic sheeting, where the cube corner retroreflective elements have been coated with a reflective coating, such as aluminum or silver. With metalized retroreflective sheeting, the microprisms operate through principles of specular reflection.

SUMMARY

One embodiment of the present disclosure provides microprismatic retroreflective film, comprising a substrate and metalized microprisms located on the substrate. At least a portion of the metalized microprisms are forward-tilted microprisms, and at least a portion of the forward-tilted microprisms are aligned with the plane of optical axis tilting aligned at an angle ranging from about 10 to 80 degrees with an edge of the microprismatic retroreflective film.

Another embodiment provides a method of fabricating microprismatic retroreflective film. In one embodiment, the method comprises placing metalized microprisms on a substrate wherein the metalized microprisms have a reflective coating thereon. At least a portion of the metalized microprisms are forward-tilted microprisms, and at least a portion of the forward-tilted microprisms are aligned with the plane of optical axis tilting aligned at an angle ranging from about 10 to about 80 degrees with an edge of the microprismatic retroreflective film. An adhesive layer is bonded to the metalized microprisms, and a release liner is attached to the adhesive layer.

BRIEF DESCRIPTION

Reference is now made to the following descriptions taken in conjunction with the accompanying drawings, in which.

Figure 3A:
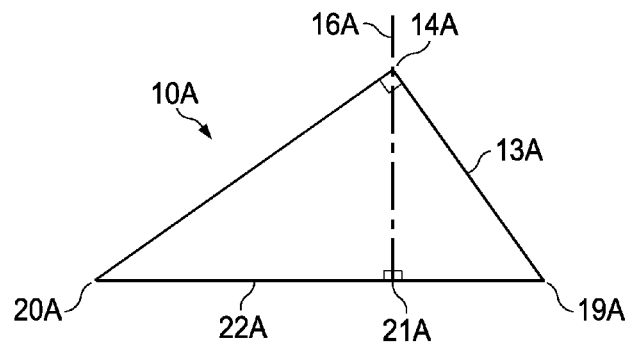
Figure 3B:
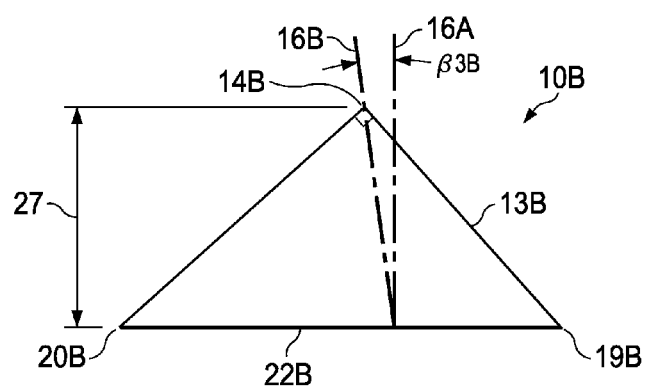
Figure 3C:
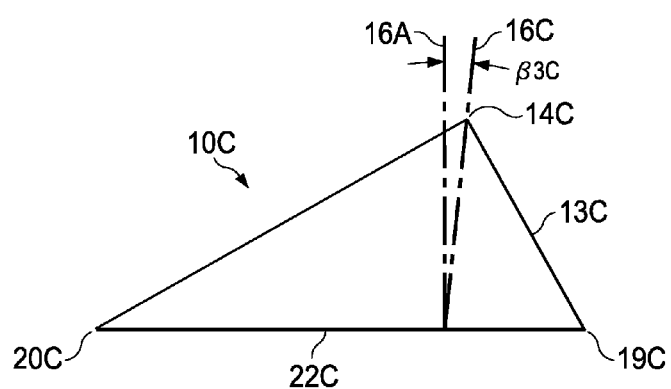
Figure 4:
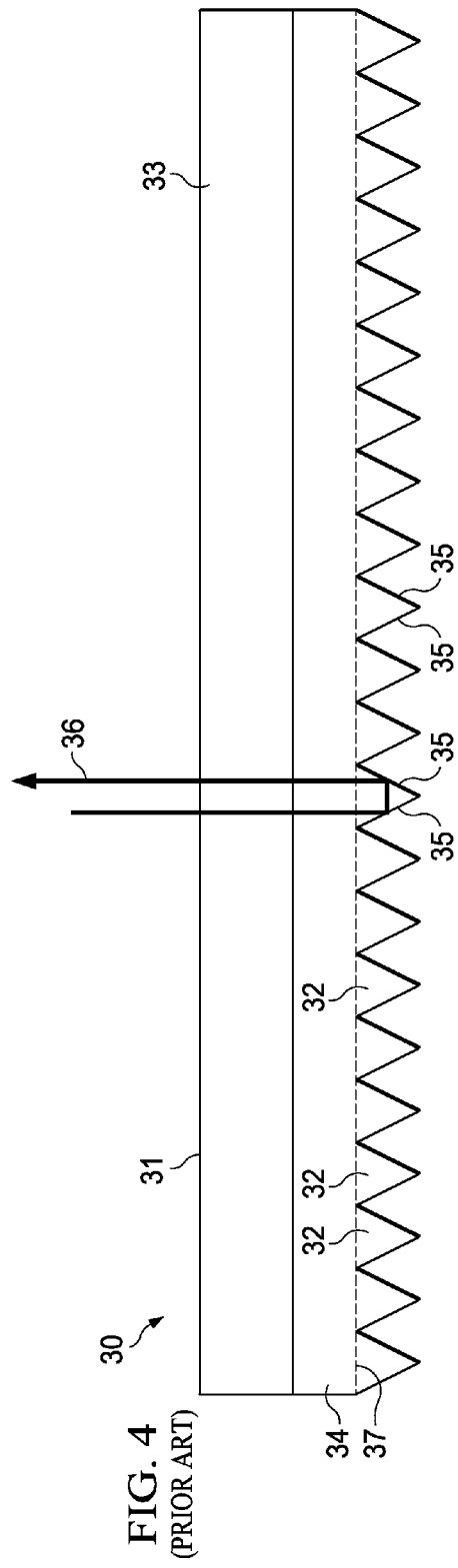
Figure 5:
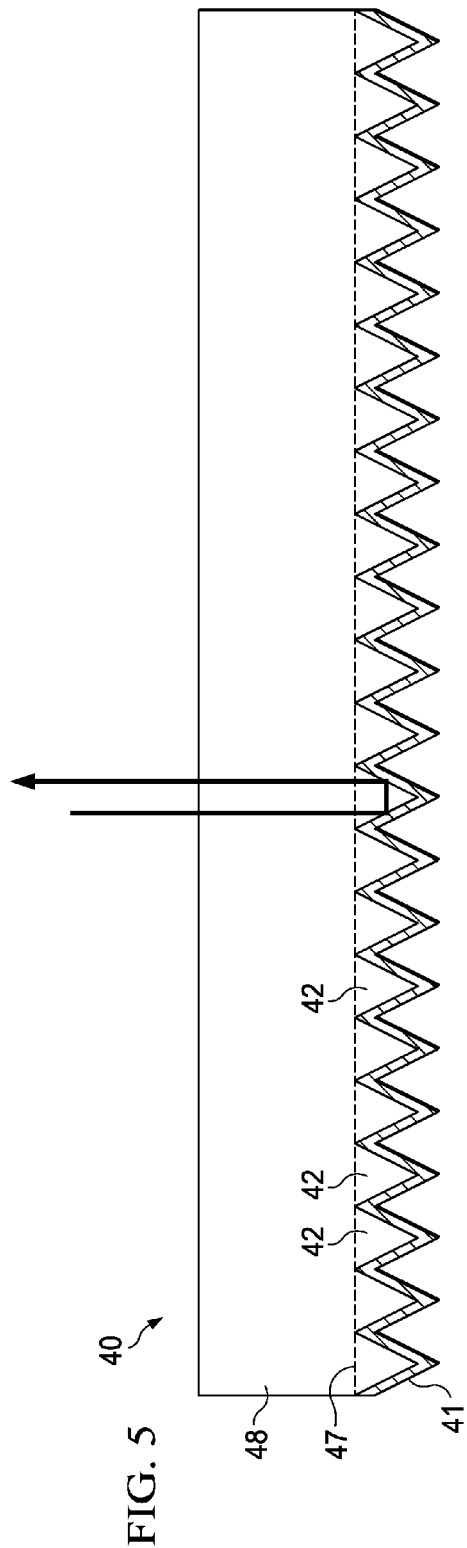
Figure 6:
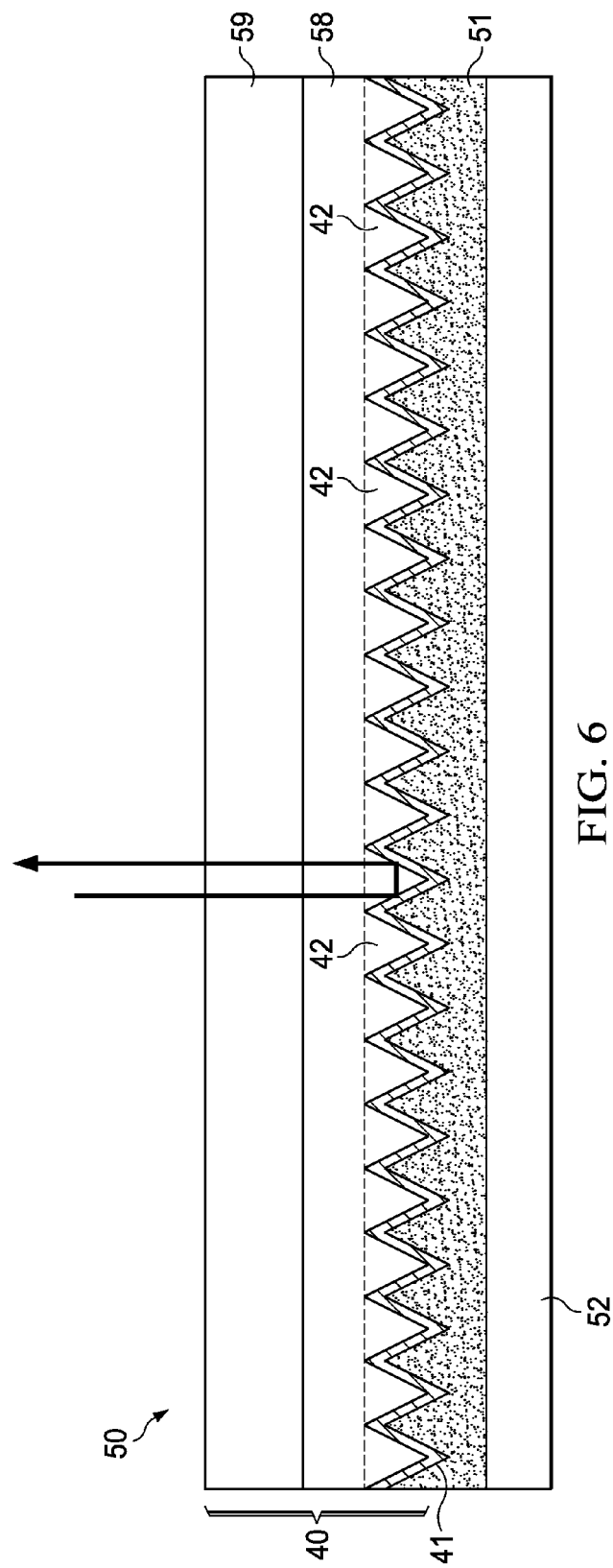
Figure 7:
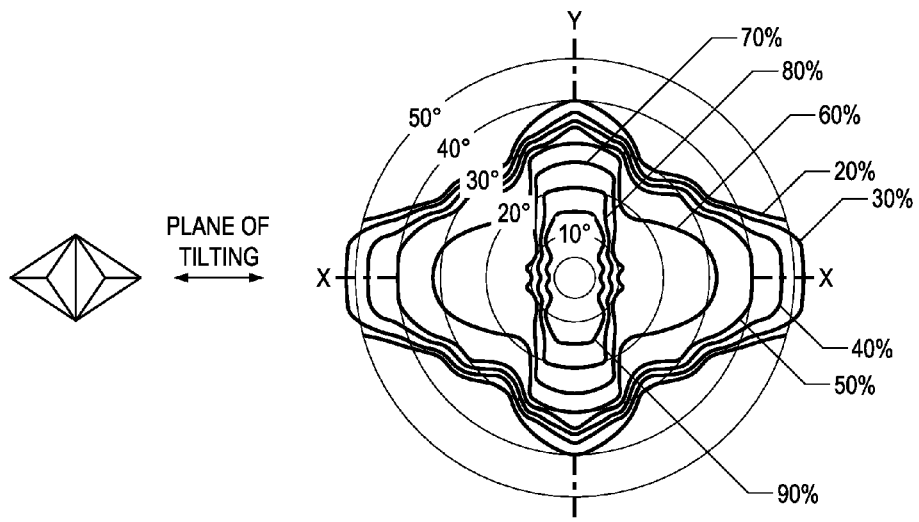
Figure 8:
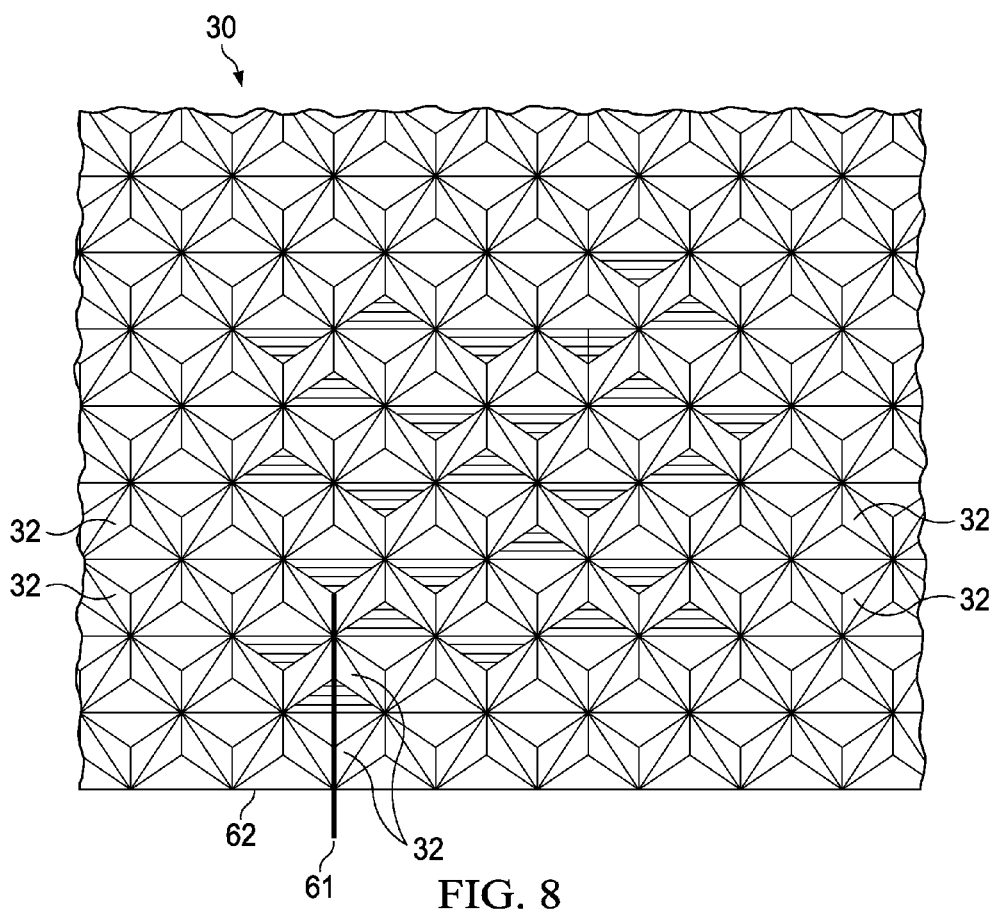
Figure 9:
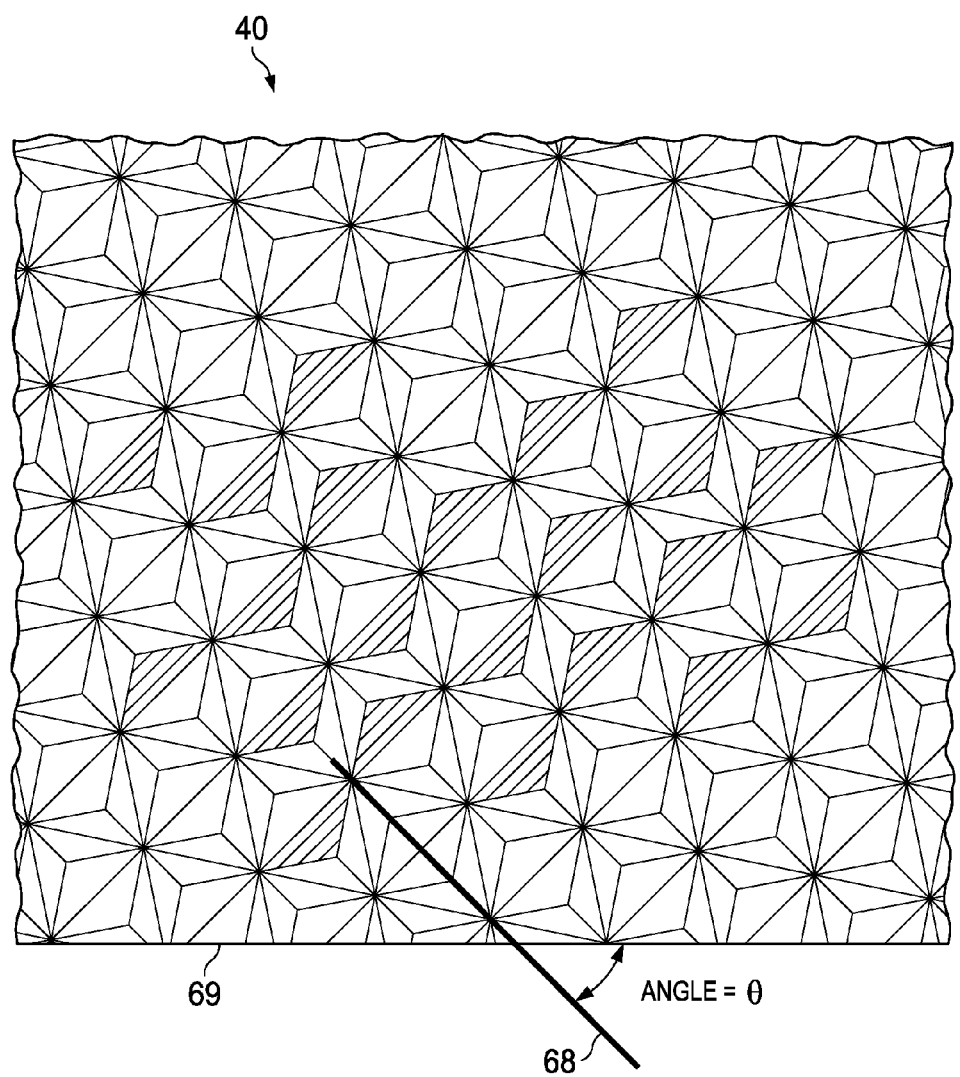
Figure 10A:
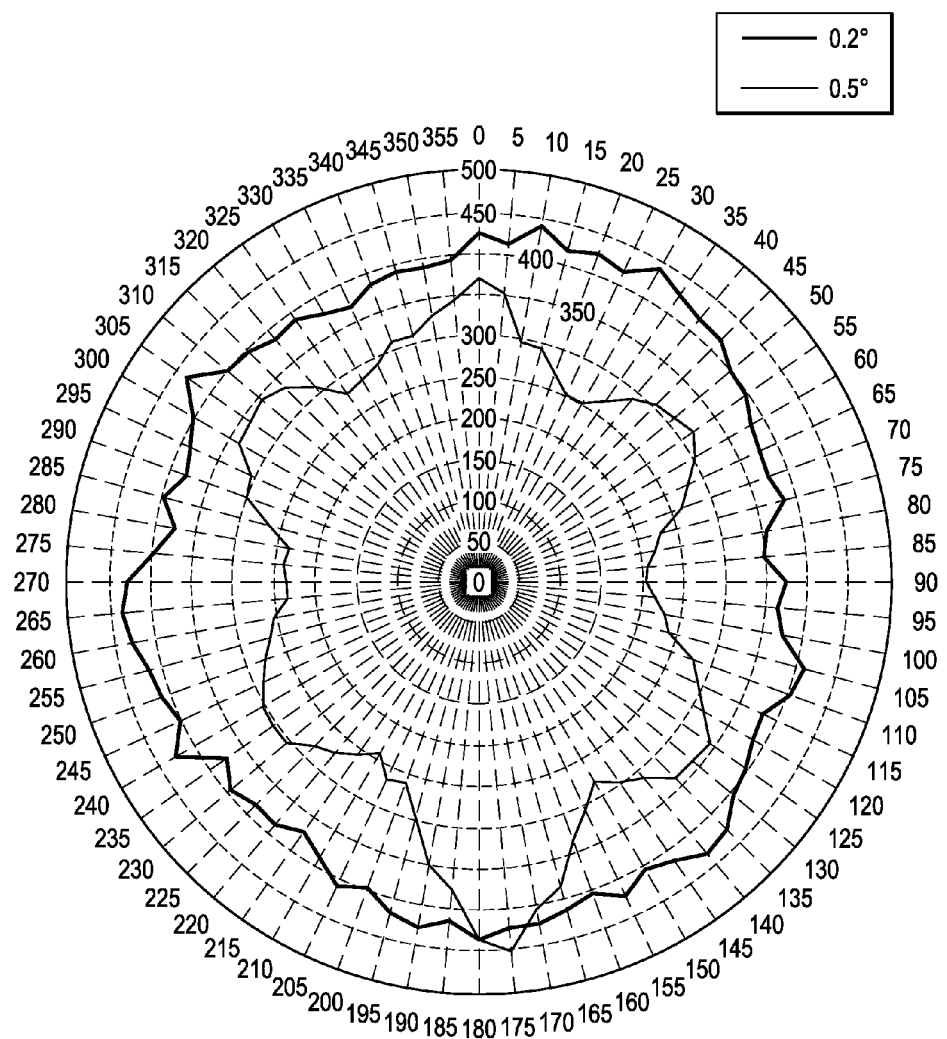
Figure 10B:
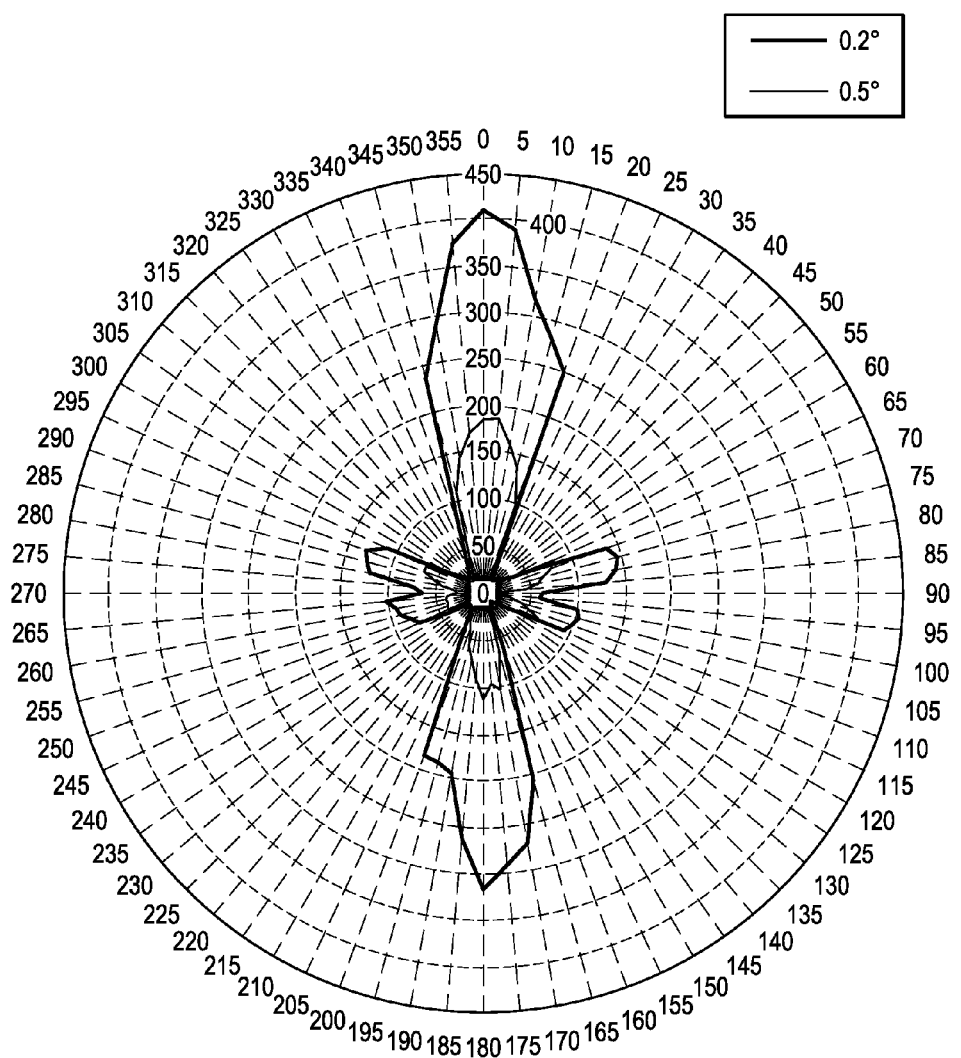
Figure 11A:
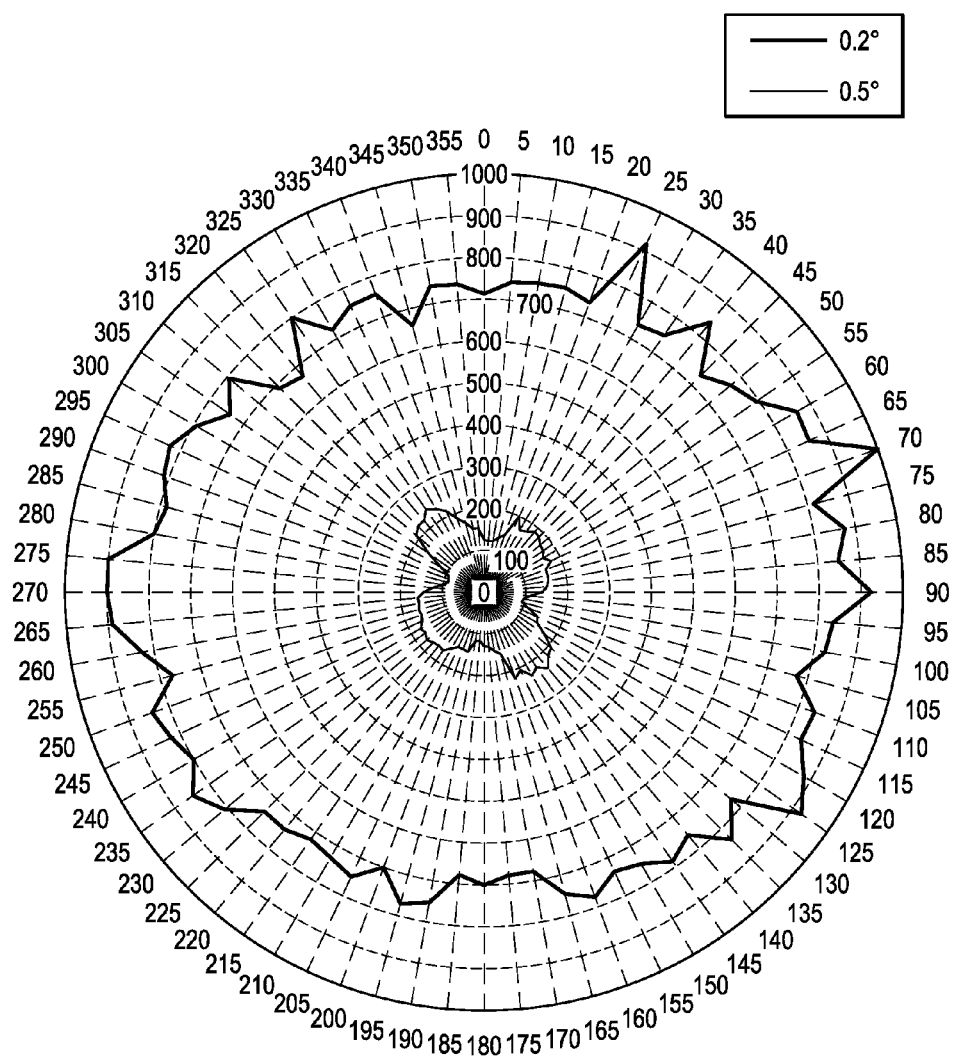
Figure 11B:
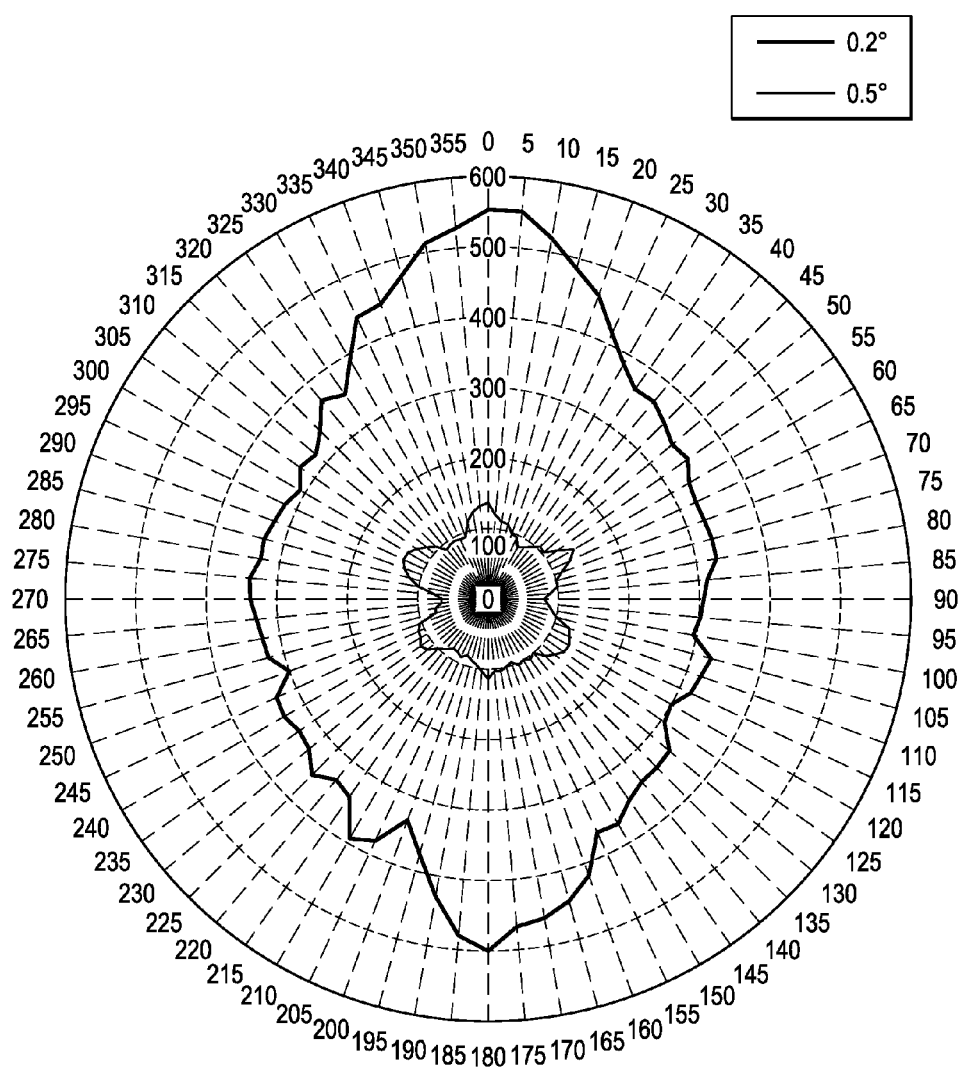
Figure 11C:
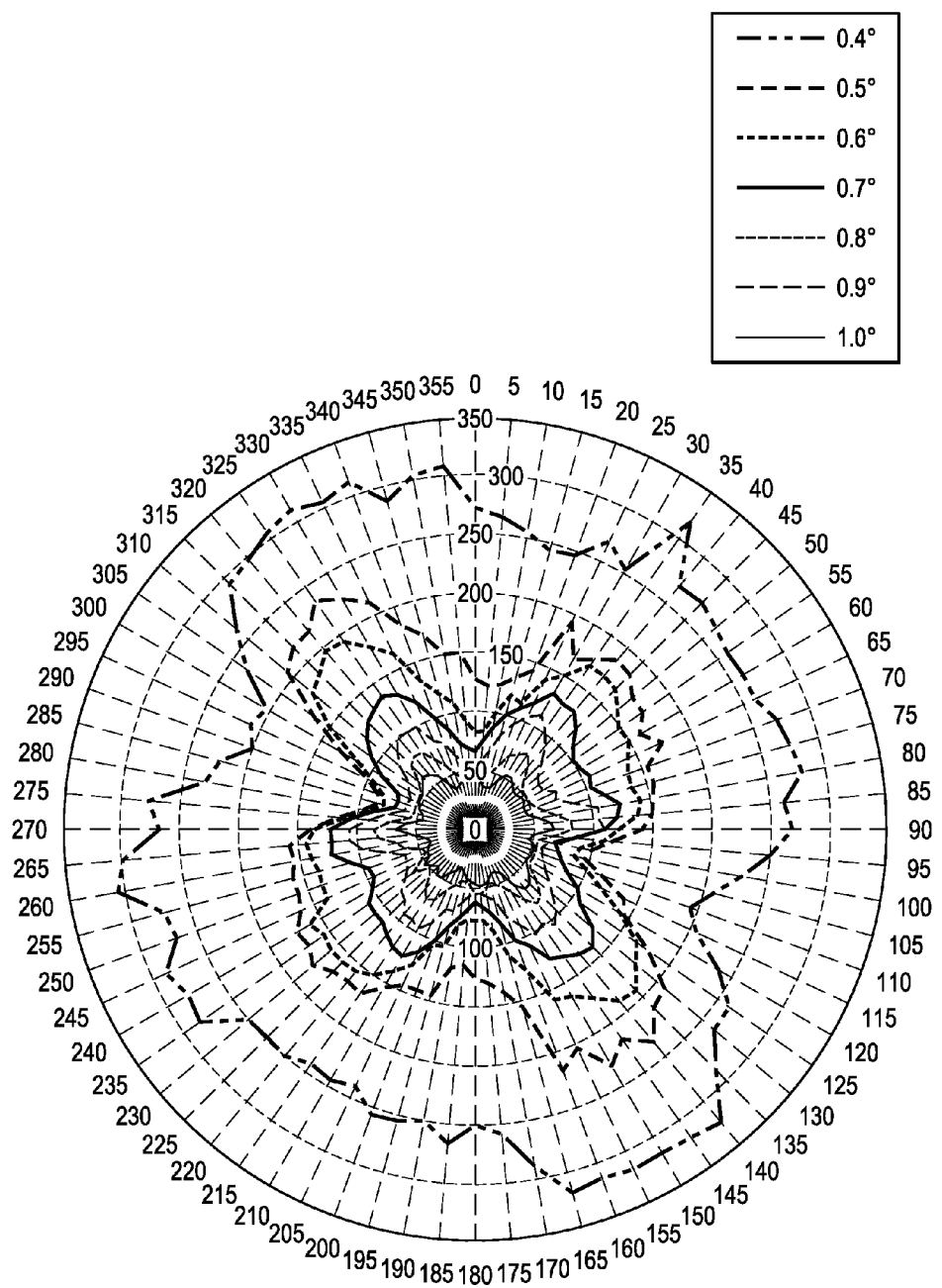
Figure 12:
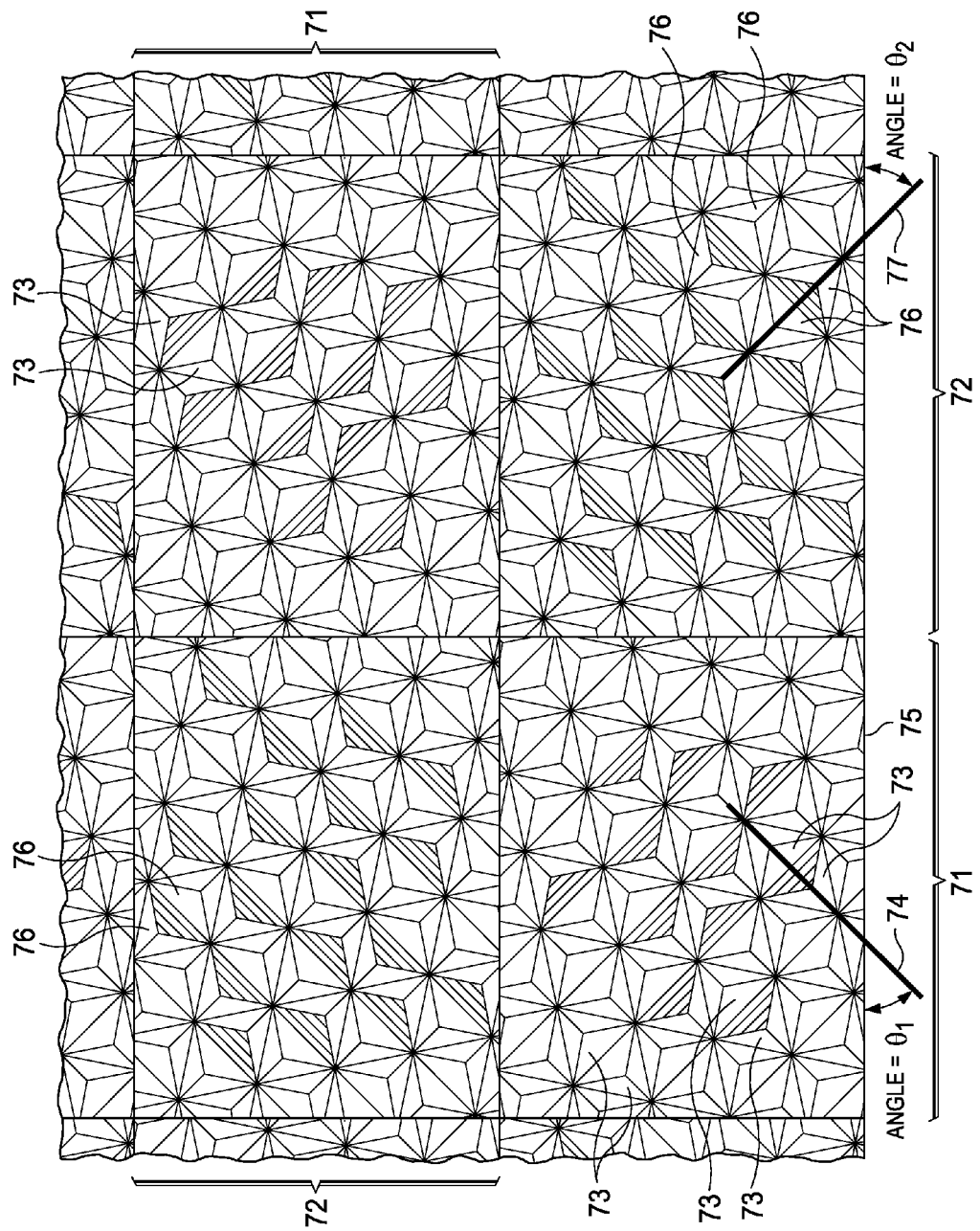
Figure 13:
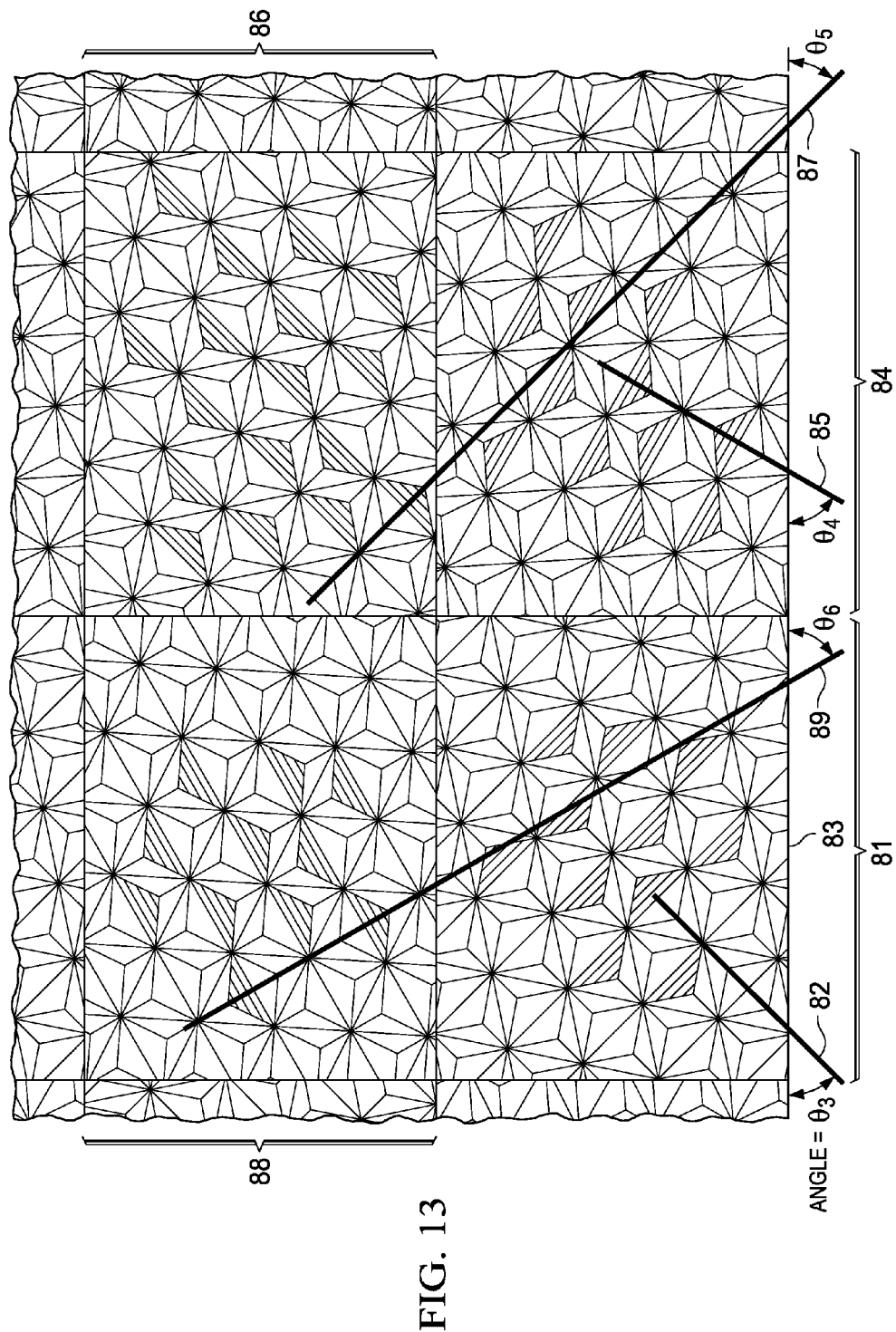
Figure 14:
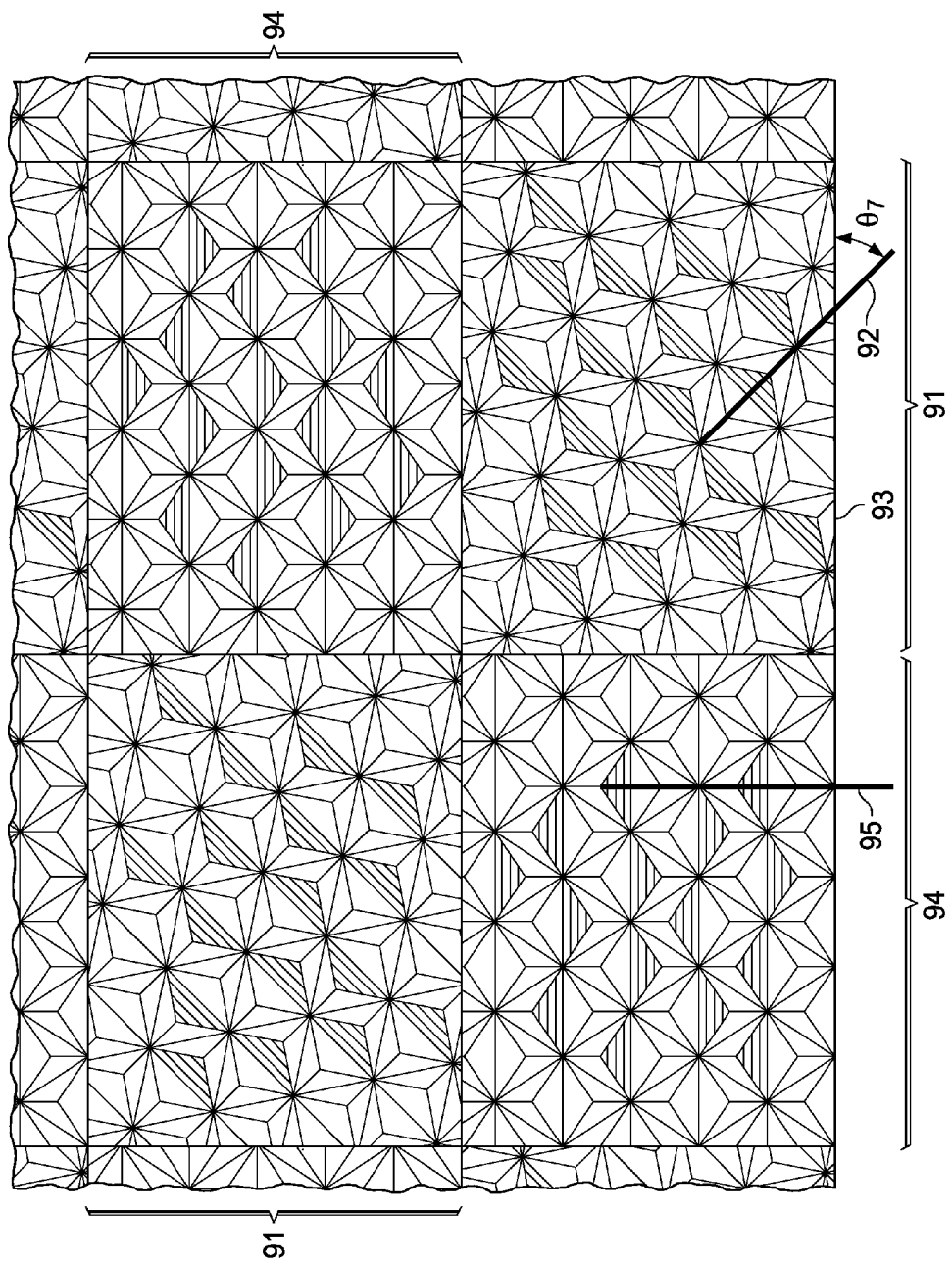

FIGS. 3A-3C provide a cross-sectional perspective of these same three microprisms along the plane defined by line 18, which passes through the apex 14 for each type of prism;

FIG. 4 shows a cross-sectional view of a conventional microprismatic retroreflective film;

FIG. 5 illustrates one embodiment of a metalized microprismatic retroreflective film;

FIG. 6 illustrates one embodiment of a metalized microprismatic retroreflective sheeting;

FIG. 7 is shows the theoretical retroreflective performance of forward-tilted microprisms operating through total internal reflection of conventional retroreflective film;

FIG. 8 illustrates a conventional arrangement of forward-tilted microprisms;

FIG. 9 illustrates one embodiment of a magnified portion of the underside of retroreflective film;

FIGS. 10A and 10B illustrate the retroreflective performance properties of a retroreflective film containing forward-tilted microprisms operating through the principles of total internal reflection;

FIGS. 11A-11C illustrate the retroreflective performance properties of another example of retroreflective film as provided herein;

FIG. 12 illustrates one embodiment of a tiling configuration where two discrete tiling arrays of forward-tilted microprisms have been parquetted together;

FIG. 13 illustrates another embodiment of a tiling configuration wherein four different discrete tiling arrays of forward-tilted microprisms have been parquetted together; and FIG. 14 illustrates another embodiment of a tiling configuration where only a portion of the tiling arrays of forward-tilted microprisms have the plane of optical axis tilting aligned at an angle with the edge of the film.

DETAILED DESCRIPTION

The role of observation angularity is becoming increasingly important. As more trucks and other heavy vehicles populate the roadways, it is becoming increasingly important for retroreflective film to be more effective at larger observation angles. Likewise, as the driving population ages and the eyesight of older drivers diminishes, it is becoming increasingly important for enhanced retroreflective properties at shorter distances, where larger observation angles typically exist, to assist older drivers with detecting and reading traffic signs or other retroreflective objects. As such, there is a need for retroreflective film that provides improved performance at larger observation angles. Further, because most retroreflective materials are applied in either a horizontal or vertical position, there is a need for improved observation angularity in such positions.

As is known in the art, microprismatic retroreflective elements are generally rotationally sensitive. As such, there have been many efforts in the prior art to optimize certain retroreflective performance properties for use in either a horizontal or vertical application. Many such efforts have either involved alternative microprism designs or tiling, which is a technique known in the art where different discrete arrays of microprisms have been aligned at different rotations within the same film.

For the most part, all of the prior art efforts to optimize various retroreflective performance attributes in either vertical or horizontal applications have focused on microprismatic retroreflective film where the microprisms operate through the principles of total internal reflection, such as with encapsulated microprismatic film.

However, there are several advantages to metalized microprismatic films compared with encapsulated microprismatic materials. For example, due to the two-layer nature of the encapsulated microprismatic film, there is the potential for dirt, water, or other contaminants to penetrate into the cells from the edge of the product. If this occurs, it could potentially lead to the cracking or rupturing of the bridges which bond the retroreflective face film to the backing film. This, in turn, could potentially lead to delamination of the retroreflective face film. As such, the edges of the encapsulated microprismatic film often need to be sealed to prevent any such penetration of water or dirt. With metalized microprismatic films, due to the single-layer nature of the construction, there are no open cells for water or dirt to penetrate into the product. Similarly, due to this structural difference, metalized retroreflective films are often thinner and therefore easier to cut and apply.

Despite these advantages, however, there is one disadvantage to metalized microprismatic retroreflective films. Metalized microprismatic materials typically have lower retroreflective performance properties at larger observation angles, such as observation angles greater than 0.2 or 0.3 degrees. The embodiments of this disclosure provide for a unique improvement to this deficiency.

The embodiments of this disclosure provide for a metalized microprismatic retroreflective film construction containing forward-tilted microprisms, where at least a portion of these forward-tilted microprisms have been aligned with the plane of optical axis tilting aligned at an angle between 10 and 80 degrees with the edge of the film. In another embodiment, the angle is between 15 and 75 degrees and in yet another embodiment, the angle is between 30 and 60 degrees. This unique and unconventional alignment has been found to improve the observation angularity of the metalized retroreflective film when the film is utilized in either a vertical or horizontal position.

Forward-tilted microprisms are one of the four main categories of cube corner retroreflective elements. The other three categories are equilateral microprisms, backward-tilted microprisms, and scalene microprisms.

Figure 1:
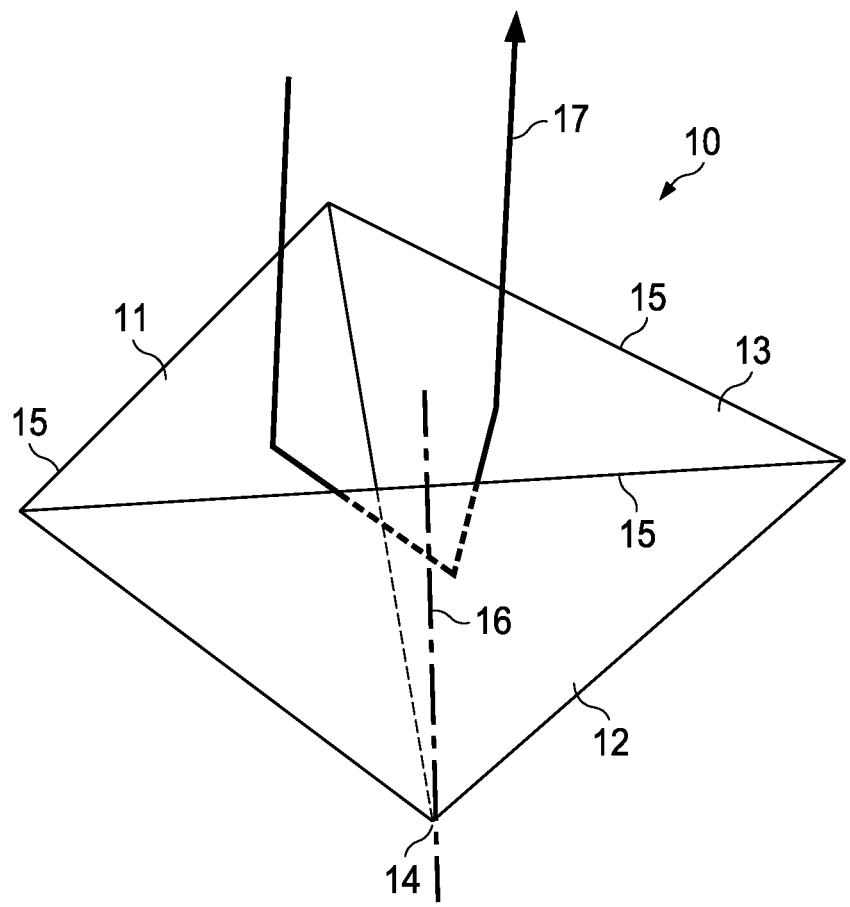
FIG. 1 illustrates a cube-corner retroreflective element 10.

A cube-corner retroreflective element 10 is depicted in FIG. 1. It has three mutually substantially perpendicular lateral faces 11, 12, and 13, which intersect at an apex 14. The base edges 15 of the lateral faces 11, 12, and 13 define the base plane (also known as the base triangle) of the retroreflective cube corner element 10. The cube corner retroreflective element 10 also has an optical axis 16, which extends through the apex 14 to trisect the base plane defined by the edges 15. In operation, light will enter the cube corner element through the base triangle defined by the three edges 15. The light will strike the first lateral face 11 to be reflected towards the second lateral face 12, which, in turn, will then reflect the light towards the third lateral face 13. Lateral face 13 will then reflect the light a third time to redirect the light back towards its source as depicted by arrow 17.

Figure 2A:
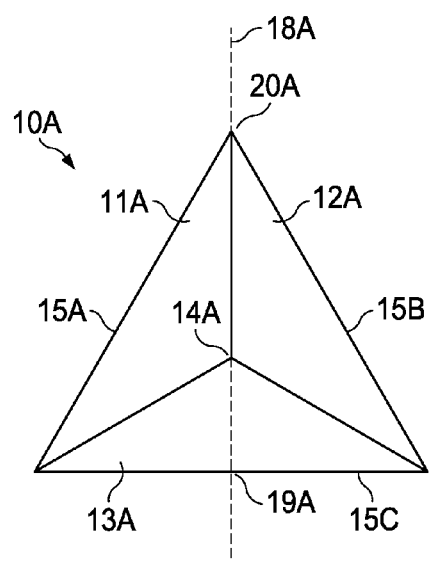
FIGS. 2A-2C illustrate a top view perspective of three of the four different classifications of cube corner microprisms.
Figure 2B:
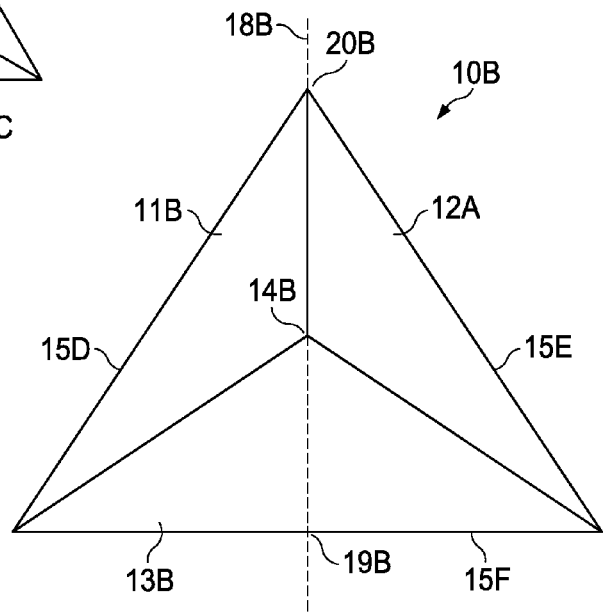
Figure 2C:
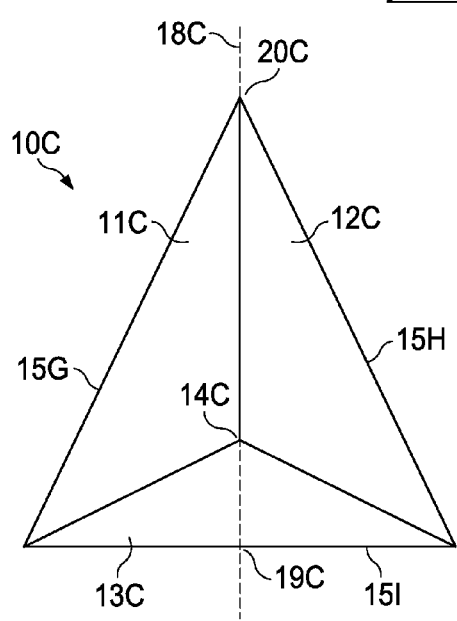

FIGS. 2A-2C provide for a top view perspective of three of the four different classifications of cube corner microprisms. FIGS. 3A-3C provide a cross-sectional perspective of these same three microprisms along the plane defined by line 18, which passes through the apex 14 for each type of prism.

Although the invention contemplates the use of forward-tilted microprisms, to assist with defining terminology, a discussion of the different types of microprisms is provided. The most basic type of microprism is an equilateral microprism depicted in FIGS. 2A and 3A. With equilateral microprism 10A, the optical axis 16A is perpendicular to the base plane 22A defined by edges 15A, 15B, and 15C. As such, all three of the lateral faces 11A, 12A, and 13A are identical, and the base plane forms an equilateral triangle. For an equilateral microprism, the cross-sectional plane defined by line 18A intersects the base triangle at vertex 20A and intersects the midpoint 19A of base edge 15C.

As is known in the art, however, the retroreflective performance properties of cube corner retroreflective elements can be altered by tilting the optical axis. The other three classifications of microprisms (forward-tilted, backward-tilted, and scalene microprisms) all have a tilted optical axis. The present disclosure incorporates forward-tilted microprisms as generally described and shown in FIGS. 2B and 3B. However, for reference purposes, backward-tilted microprisms are depicted in FIGS. 2C and 3C.

FIGS. 2B and 3B depict the forward-tilted microprisms of the retroreflective film as provided by certain embodiments. The forward-tilted microprisms 10B have an optical axis 16B tilted directly towards one of the vertices 20B of the base triangle defined by edges 15D, 15E, and 15F. As such, the optical axis 16B is tilted directly away from lateral face 13B and is no longer perpendicular to the plane 22B of the base triangle. The base triangle defined by edges 15D, 15E, and 15F is an isosceles triangle where one of the included angles is greater than 60 degrees and the other two included angles are less than 60 degrees. FIG. 3B depicts the cross-sectional plane defined by line 18B, which intersects vertex 20B, apex 14B, and mid-point 19B of edge 15F. In FIG. 3B, the optical axis 16A is superimposed in the figure as a reference point to define the tilt angle β3B. The tilt angle is defined as the degree of tilting, either forward or backward, from the perpendicular position of the optical axis 16A of an equilateral microprism.

FIGS. 2C and 3C depict a backward-tilted microprism 10C where the optical axis 16C is tilted directly towards one of the lateral faces 13C and away from vertex 20C. As with forward-tilted microprisms, the optical axis is no longer perpendicular to plane 22C of the base triangle. The base triangle defined by edges 15G, 15H, and 15I is an isosceles triangle where one of the included angles is less than 60 degrees and the other two included angles are greater than 60 degrees. The cross-sectional plane 18C intersects vertex 20C, apex 14C, and mid-point 19B of edge 15I.

Although not shown in any of the drawings, scalene microprisms are tilted microprisms where the optical axis is not tilted directly towards or away from any vertex of the base triangle. As such, the base triangle is a scalene triangle.

The metalized microprismatic retroreflective film as provided by the embodiments of the present disclosure contains forward-tilted microprisms, where the plane of optical axis tilting is aligned at an angle between 10 and 80 degrees with the edge of the film. The plane of optical axis tilting is the geometric plane which is perpendicular to the base plane and which includes the optical axis. For the tilted microprisms depicted in FIGS. 2B and 3B and 2C and 3C, the plane of optical axis tilting is also the cross-sectional plane defined by vector 18B or 18C. Thus, for the forward-tilted microprisms as provided by the embodiments of this disclosure, the plane of optical axis tilting intersects vertex 20B, apex 14B, and mid-point 19B of base triangle edge 15F.

FIG. 4 shows a cross-sectional view of a conventional microprismatic retroreflective film 30. It possesses an outer face surface 31, and many microprismatic retroreflective optical elements 32 project from the under-side of the reflective film 30. It is constructed from one or more layers of light transmissible polymeric materials. In this specific drawing, the microprismatic retroreflective film 30 comprises two different layers: an upper layer 33 and a lower microprismatic layer 34. However, as is known in the art, the microprismatic retroreflective film 30 may be constructed from several different layers of light transmissible polymeric materials. Light enters the microprismatic retroreflective film 30 through the outer face surface 31. It will pass through the layer(s) of polymeric material to strike the planar faces 35 of the microprismatic retroreflective optical elements 32 and then returns toward its source as depicted by arrow 36. As discussed above, light will actually strike three lateral faces before being returned towards the source. However, in this figure, the cross-sectional diagram only depicts the microprisms in two dimensions. The base plane of the microprisms is shown as dashed line 37.

The retroreflective film 30 of FIG. 4 is fully functional and will retroreflect light through the principles of total internal reflection. In practice, however, most retroreflective film products in which the microprisms operate through the principles of total internal reflection are encapsulated microprismatic retroreflective films, as is well known in the art. As disclosed in more detail below, however, one limiting factor of retroreflective films containing forward-tilted microprisms operating through the principles of total internal reflection, regardless of whether such films are used alone or as part of an encapsulated microprismatic film, is that such retroreflective films are rotationally sensitive and the microprisms are aligned with the plane of optical axis tilting in either a horizontal or vertical position for optimal retroreflective performance.

Alternatively, a microprismatic retroreflective film can be coated with a reflective coating, such as vacuum-deposited aluminum, nickel, or silver, to create a metalized microprismatic retroreflective film where the microprisms operate through the principles of specular reflection.

FIG. 5 is one embodiment of a metalized retroreflective film 40 where the lateral faces of the microprisms 42 have been coated with a reflective coating 41. The base of the microprisms is depicted by a dashed line 47. In this specific drawing, the metalized retroreflective film 40 is comprised of a single layer of polymeric material 48. However, as is known in the art, the metalized microprismatic retroreflective film 40 may be constructed from several different layers of light transmissible polymeric materials. Here, the microprisms function through the principles of specular reflection. The reflective coating 41 is commonly a metallic material, such as silver, nickel, or aluminum.

FIG. 6 depicts an embodiment of a metalized microprismatic retroreflective film, such as a microprismatic retroreflective sheeting 50, as provided by the present disclosure. Here, the cube corner retroreflective elements 42 of metalized retroreflective film 40 have been coated with a reflective coating 41. Adhesive layer 51 is provided on the underside of reflective coating 41 with release liner 52, which can be removed from the adhesive 51 prior to application. Although the metalized retroreflective film 40 can be made from one polymeric layer or several polymeric layers, in this specific drawing, the metalized retroreflective film comprises an upper layer 59 and a lower layer 58, which contains the microprisms 42.

The retroreflective performance of forward-tilted microprisms in retroreflective film products where such microprisms operate through the principles of total internal reflection is well understood in the prior art. For example, see patents Hoopman, U.S. Pat. No. 4,588,258, Szczech, U.S. Pat. No. 5,138,488, and Nestegard et al, U.S. Pat. Nos. 5,706,132 and 5,936,770. The key performance benefit of such prior art is improved entrance angularity.

FIG. 7 is a reproduction of FIG. 6 of Hoopman, U.S. Pat. No. 4,588,258 and shows the theoretical retroreflective performance of forward-tilted microprisms operating through total internal reflection. The graph shows the 360-degree rotational performance with respect to entrance angularity. In the figure, the plane of optical axis tilting corresponds with the "x-axis" of the graph. As can be seen in FIG. 7, two broad planes of entrance angularity exist. The first plane, which is aligned with the plane of optical axis tilting provides for levels of entrance angularity beyond 50 degrees. The second plane of improved entrance angularity exists perpendicular to the plane of optical axis tilting, although the performance in this second plane is not quite as strong as the first. However, as can be seen in FIG. 7, entrance angularity is significantly diminished at rotations between 15 to 75 degrees from either the x-axis or y-axis of the graph.

As such, prior art retroreflective film constructions incorporating forward-tilted microprisms have aligned the plane of optical axis tilting either perpendicular or parallel to the edge of the film. FIG. 8 illustrates such a conventional arrangement of forward-tilted microprisms. FIG. 8 depicts a magnified portion of the underside of retroreflective film 30 to show the alignment of the microprismatic retroreflective elements 32. As shown, the microprisms 32 are disposed as optically opposing matched pairs in the array of microprisms throughout retroreflective film 30. The plane of optical axis tilting 61 is aligned substantially perpendicular to the edge 62 of the retroreflective film 30. Another traditional arrangement (not shown), has the plane of optical axis tilting aligned parallel to the edge of the film. Further, in other prior art (not shown), the technique of tiling is used to incorporate multiple zones of microprism arrays where alternating zones have the plane of optical axis tilting aligned perpendicular and parallel to the edge of the retroreflective film.

Embodiments of the present disclosure, however, incorporate forward-tilted microprisms into retroreflective film wherein the plane of optical axis tilting is aligned between 10 and 80 degrees with the edge. Based upon the teachings in the prior art, this would be an undesirable alignment due to the significant reduction in entrance angularity. However, the embodiments of the present disclosure provide an unanticipated improvement in observation angularity without a significant reduction in entrance angularity when this unconventional alignment is incorporated into metalized retroreflective film.

FIG. 9 depicts one embodiment of a magnified portion of the underside of retroreflective film 40. As shown in FIG. 9, the plane of optical axis tilting 68 is aligned at angle θ to the edge 69 of the film. In one aspect, angle θ is preferably between 10 and 80 degrees, and in another embodiment, angle θ is between 15 and 75 degrees, and in yet another embodiment, the angle θ is between 30 and 60 degrees.

The retroreflective performance improvements provided by embodiments of the present disclosure will now be demonstrated through an example contrasting the performance profiles of a non-metalized retroreflective film with a metalized retroreflective film.

EXAMPLE I

Using diamond turning techniques known in the art, a master tool was diamond machined by cutting three sets of V-grooves intersecting in a pattern to define an array of microprisms. In this example, forward-tilted prisms were ruled with a forward tilt of approximately 6.2 degrees and a prism height of approximately 67 microns. Then, using electroforming techniques known in the art, multiple nickel electroform copies of this diamond-turned master ruling were made and assembled together to form a cylindrical embossing tool. Pricone et al, U.S. Pat. No. 4,478,769 describes one such electroforming and assembly process, which is incorporated herein by reference.

COMPARATIVE EXAMPLE 1A

Through the use of heat and pressure, three layers of acrylic polymethyl methacrylate films totaling approximately 250 microns were embossed into the cylindrical microprismatic tooling to mold the forward-tilted microprisms into one side of the resulting acrylic film. In this example, the acrylic polymethyl methacrylate films were made from two different impact-modified acrylic resins. The first acrylic resin was DR-101 available from Arkema, Inc. of Philadelphia, Pa., and the second acrylic resin was CA-1000 available from Plaskolite West, Inc. of Compton, Calif. Both acrylic resins had a refractive index of approximately 1.49. Prior to cooling, a high-gloss polyester carrier film was temporarily laminated onto the face-side of the acrylic film to ensure that a smooth and high-gloss face-side surface was maintained. The cylindrical microprismatic tooling was then rapidly cooled and the embossed microprismatic acrylic film was then removed from the tooling. The temporary polyester carrier film was then removed from the face-side of this embossed microprismatic retroreflective film. At this point, the resulting retroreflective film was very similar to that of FIG. 4, where the microprisms operate through the principles of total internal reflection.

The retroreflective performance properties of this example are shown in FIGS. 10A and 10B. FIG. 10A shows how the retroreflective performance properties (as defined as the coefficient of retroreflection with units of cd/lx/m2) vary as the film is rotated through 360 degrees for both 0.2° and 0.5° observation angles at a −4° entrance angle. FIG. 10B provides the same data at a 30° entrance angle. In each figure, the plane of optical axis tilting is aligned with the vertical axis, which is aligned with 0 and 180 degrees of rotation.

As can be seen from these graphs, the retroreflective performance properties of this example are similar to the theoretical performance properties of forward-tilted microprisms shown in FIG. 7. Improved retroreflective performances at larger entrance angles, such as 30 degrees, exist along planes parallel and perpendicular to the plane of optical axis tilting. Further, as described in the prior art, the retroreflective performance properties are greater along the plane of optical axis tilting. Additionally, as predicted by the prior art, there exists a significant reduction of retroreflective properties at larger entrance angles at rotations which are neither a parallel or perpendicular position of the plane of optical axis tilting.

The fact that the retroreflective performance properties do not perfectly match theoretical performance could be due to a number of possible factors such as imperfections in the original diamond turned master, manufacturing errors, impurities in raw materials, or similar factors.

EXAMPLE 1B

For Example 1B, prior to removing the temporary polyester carrier, the retroreflective film of Comparative Example 1A was metalized by vacuum-depositing aluminum of greater than 99.9% purity onto the surface of the lateral faces of the microprisms. A pressure-sensitive adhesive and release liner were then laminated to the microprisms, and the temporary polyester carrier film was then removed. This created a microprismatic retroreflective film construction similar to that shown in FIG. 6.

The retroreflective performance properties of this example are shown in FIGS. 11A and 11B, where the plane of optical axis tilting is again aligned with the vertical axis. However, these profiles are uniquely different from the profiles of Comparative Example 1A, despite the fact that the same exact microprisms are utilized. As anticipated, retroreflection at 0.5° observation angle generally decreases. However, for small entrance angles, such as −4 degrees, the highest levels of decrease generally occur at positions parallel or perpendicular to the plane of optical axis tilting. Surprisingly, however, in this example, observation angularity is maximized at rotations between about 15° and 75° from a position parallel or perpendicular to the plane of optical axis tilting, not at rotations aligned parallel or perpendicular to the plane of optical axis tilting.

More surprisingly, at a large entrance angle of 30°, similar performance peaks of observation angularity exist, even at rotations such as 45 degrees. Unlike the film of Comparative Example 1A, the significant reduction of retroreflection performance properties at rotations such as 45 degrees does not occur.

Given the unique performance profiles of metalized forward-tilted microprisms, a traditional alignment of forward-tilting microprisms, as shown in a FIG. 8, would be generally undesirable for optimal observation angularity. Certain embodiments of this disclosure, therefore, contemplate a microprism alignment where the plane of optical axis tilting is rotated relative to the edge of the film to align the microprisms at an ideal rotation to maximize observation angularity without suffering the significant entrance angularity performance deficiencies at such rotations when the prisms operate through the principles of total internal reflection.

The exact degree of microprism rotation relative to the edge of the film can be selected based upon the specific observation angularity requirements for a given application. FIG. 11C provides the observation angularity performance for several difference observation angles at a −4° entrance angle for the same metalized microprismatic retroreflective film of Example 1B. As can be seen from FIG. 11C, the optimal rotation will vary slightly for different observation angles. For example, to maximize the performance at 0.5° or 0.6° observation angles, it may be desirable to rotate the microprisms where the plane of optical axis tilting is aligned at a 45° or 50° angle to the edge of the film. For an observation angle such as 0.7°, a rotation of 30° may be desirable. As can be seen in FIG. 11C, the improved observation angularity occurs for different observation angles when the plane of optical axis tilting is aligned at rotations from about 10° to 80° degrees.

Additionally, embodiments of the present disclosure also contemplate the use of tiling to blend different rotations together into the same metalized, microprismatic retroreflective film.

FIG. 12 provides for a tiling configuration where two discrete tiling arrays of forward-tilted microprisms have been parquetted together. The first microprism tiling array 71 has the forward-tilted microprisms 73 aligned where the plane of optical axis tilting 74 is aligned at angle θ1 with the edge 75 of the film. The second microprism array 72 has the forward-tilted microprisms 76 aligned where the plane of optical axis tilting 77 is aligned at angle θ2 with the edge 75 of the film. In this specific figure, θ1 is approximately positive 45° and θ2 is approximately negative 45°. This specific tiling configuration may be desirable to create a more uniform observation angularity performance profile between both vertical and horizontal application positions. As can be seen in FIG. 11C, the observation angle performance at 0.5° is slightly higher at a rotation of 315° (negative 45°) than at positive 45°. By blending two such rotations together, a more balanced retroreflectivity can be achieved between vertical and horizontal positioning of the retroreflective films. Similarly, to optimize performance at a 0.8° observation angle, it may be desirable to set θ1 of FIG. 12 to approximately positive 30° and θ2 to approximately negative 30°.

FIG. 13 provides another embodiment of a tiling configuration wherein four different discrete arrays have been parquetted together. The first microprism array 81 has the plane of optical axis tilting 82 aligned at angle θ3 with the edge 83 of the film. The second microprism array 84 has the plane of optical axis tilting 85 aligned at angle θ4 with the edge 83 of the film. The third microprism array 86 has the plane of optical axis tilting 87 aligned at angle θ5 with the edge 83 of the film. The fourth microprism array 88 has the plane of optical axis tilting 89 aligned at angle θ6 with the edge 83 of the film.

This type of tiling arrangement with four (or more) discrete arrays of forward-tilted microprisms may be useful for several different reasons. First, to account for potential manufacturing errors or similar errors where the microprisms may not have identical performance at 180° rotations to each other, embodiments of the disclosure encompass aligning the microprisms with the plane of optical axis tilting aligned with the edge of the film in increments of 90°. For example, θ3 could be equal to 45°, θ4 equal to 135°, θ5 equal to 225° (i.e. negative 135°), and θ6 equal to 315° (i.e. negative 45°). Other embodiments encompass different arrays within a tiling configuration having four or more arrays having the planes of optical axis tilting aligned with the edge of the film in increments of 180°. For example, θ3 could be equal to 30°, θ4 equal to 150°, θ5 equal to 210° (i.e. negative 150°), and θ6 equal to 330° (i.e. negative) 30°. Here, θ3 and θ5 are 180° apart. Likewise, θ4 and θ6 are 180° apart.

Further embodiments of this disclosure covers alignments to optimize performance at two or more observation angles. For example, θ3 may be set to approximately 45° and θ5 to approximately 315° (negative) 45° for optimization at 0.5° and 0.6° observation angles, and θ4 may be set to approximately 30° and θ6 to approximately 330° (negative 30°) for optimization at other observation angles such as 0.7° or 0.8° observation angles.

FIG. 14 provides for still another tiling configuration where only a portion of the arrays of microprisms have the plane of optical axis tilting aligned at an angle with the edge of the film. The first microprism array 91 has the plane of optical axis tilting aligned at angle θ7 with the edge 93 of the film. However, the second microprism array 94 has the plane of optical axis tilting 95 aligned perpendicular to the edge 93 of the film, which is a traditional alignment of the prior art. This type of tiling arrangement may be preferred when attempting to balance both strong performance at small observation angles, such as 0.2°, with improved performance at higher observation angles, such as 0.5°. In this specific embodiment, approximately 50% of the microprisms are aligned with the plane of optical axis tilting positioned at an angle θ7 from about 10° to 80° to the edge of the film. However, although not shown, it is not necessary for the first and second tiling arrays to be present in equivalent ratios. This invention contemplates embodiments where the first and second tiling arrays are not present in equivalent amounts. For example, greater than 50% of total number of microprisms may have the plane of optical axis tilting aligned at an angle θ7 from about 10° to 80° to the edge of the film. Alternatively, although not shown, the second array could have the plane of optical axis tilting 95 aligned parallel to the edge of the film. Further, embodiments of the present disclosure cover tiling configurations having four or more arrays of microprisms with a portion of the arrays having the plane of optical axis tilting aligned either parallel and/or perpendicular to the edge of the film, and a portion of the arrays having the planes of optical axis tilting aligned at an angle (or angles) θ from about 10 degrees to about 80 degrees with the edge of the film.

Although the figures depict the tiling arrays as rectangles arranged in a checker-board fashion, any geometric arrangement may be included. For example, the tiling arrays could be stripes, squares, triangles, circles, parallelograms, trapezoids, or any combination of imaginable shapes. Further, the tiling arrays could outline objects such as stars, corporate logos, or any imaginable pattern. Further, it is not necessary, for different tiling arrays within the same retroreflective film to be the same size, and one set of tiling arrays may be more heavily favored than another. For example, 70% of tiling arrays within a given retroreflective film could have the plane of optical axis tilting aligned at a 45 degree angle, and 30% of the tiling arrays could be aligned at a 30 degree angle.

In addition to the improved observation angularity, another unique aspect is the fact that the forward-tilted microprisms can be aligned with the plane of optical axis tilting at angles such as 35 degrees or 45 degrees relative to the edge of the film, and the film will still retain strong entrance angularity when the film is used in a horizontal or vertical alignment. According to prior teachings regarding forward-tilted microprisms, the key benefit of forward-tilted microprisms is a significant improvement in entrance angularity, especially in the plane of the optical axis tilting. However, by gaining such improvements in entrance angularity, the film becomes increasingly rotationally sensitive at larger entrance angles, and the retroreflective performance properties at rotations not aligned with the plane of optical axis tilting decrease significantly, especially at rotations such as 35 degrees or 45 degrees. As a result, there have been extensive efforts in the art to compensate for such rotational non-uniformities.

For example, one version of an encapsulated microprismatic film containing forward-tilted microprisms available on the market is sold under the brand name Diamond Grade LDP 3924 film by 3M Corporation of St. Paul, Minn. This film is believed to contain forward-tilted microprisms with a tilt angle of approximately 9.5 degrees and a microprism height of approximately 175 microns. To compensate for the rotational sensitivity of the forward-tilted microprisms, the film has actually been sold in two different formats to ensure that that the plane of optical axis tilting is always aligned either in a horizontal or vertical position. The first version is for use on signing where the film will be aligned in a vertical or horizontal position. However, for diamond-shaped warning signs where the film would normally be rotated at 45-degrees, a second version of the product have the prisms rotated 45 degrees to ensure that the plane of optical axis tilting is still aligned in a vertical or horizontal position in the final application. An arrow is printed within this film to identify the direction in which the film must be positioned in the final application to avoid aligning the microprisms with the plane of optical axis tilting in any direction other than a horizontal or vertical position.

Embodiments of the present disclosure, however, cover utilizing the retroreflective film as provided herein with the plane of optical axis tilting in a rotated position in the final field use. Despite the fact that the plane of optical axis tilting is aligned at a traditionally disadvantageous position, the metalized retroreflective film provides strong entrance angularity. This difference between the prior art, which incorporates forward-tilted microprisms operating through the principles of total internal reflection, and the metalized film as represented by the embodiments provided herein are highlighted in Table 1.

Table 1 provides the coefficient of retroreflection for the retroreflective materials of Comparative Example 1A and Example 1B. The data highlights how the metalized film as described herein still provides strong entrance angularity notwithstanding the fact that the plane of optical axis tilting is aligned in a traditionally disadvantageous position.

TABLE 1

Coefficient of Retroreflection (cd/lx/m2) for Various Entrance Angles and Rotational Positions of the Plane of Optical Axis Tilting for a 0.2 degree Observation Angle.

| Entrance Angle | Rotational Alignment of the Plane of Optical Axis Tilting | Comparative Example 1A | Metalized Retroreflective film of Example 1B |
|---|---|---|---|
| 30° | 35° | 19 | 438 |
| | 45° | 17.5 | 423 |
| | 135° | 16 | 267 |
| | 145° | 15.5 | 287 |
| | 215° | 21 | 331 |
| | 225° | 18 | 348 |
| | 315° | 23.5 | 408 |
| | 325° | 25 | 455 |
| 40° | 35° | 8 | 134 |
| | 45° | 5.5 | 129 |
| | 135° | 6 | 132 |
| | 145° | 6 | 160 |
| | 215° | 10 | 194 |
| | 225° | 7.5 | 167 |
| | 315° | 10.5 | 197 |
| | 325° | 16 | 225 |
| 45° | 35° | 5.7 | 128 |
| | 45° | 4.3 | 126 |
| | 135° | 4.8 | 101 |
| | 145° | 6.3 | 113 |
| | 215° | 5.5 | 96 |
| | 225° | 6.0 | 97 |
| | 315° | 6.4 | 133 |
| | 325° | 7.2 | 125 |

EXAMPLE II

A cylindrical embossing tool was prepared with two discrete sections of microprismatic tooling. The microprisms for each section were forward-tilted trihedral microprisms with an optical axis tilt of approximately 6.2 degrees and a height of approximately 67 microns. Within each section, all of the microprisms were aligned in the same direction. The microprisms within the first section were aligned with the plane of optical axis tilting perpendicular to the edge of the tooling in an alignment similar to that shown in FIG. 8. The microprisms in the second section were aligned with the plane of optical axis tilting at approximately a 45 degree angle to the edge with an alignment similar to FIG. 9 where the angle θ would be equal to approximately 45 degrees.

Using an embossing process similar to that outlined in Pricone et al, U.S. Pat. No. 4,486,363, various polymeric films were fed onto the cylindrical embossing tool as outlined below in Table 2. In each instance, the microprisms were embossed into the microprism layer polymer by heating the polymer substantially above its glass transition temperature and by applying pressure through a series of silicone rubber nip rollers. Then, while the microprism polymeric layer was still engaged with the cylindrical embossing tool, one or more additional polymeric film layers were heat laminated onto the microprism polymeric layer. Then, prior to cooling, a high-gloss polyester carrier film was temporarily laminated onto the face side of the embossed film. The cylindrical embossing tool was then cooled to substantially below the glass transition temperature of the microprism layer polymer, and the resulting embossed retroreflective film structure was removed from the tooling. A reflective coating of aluminum was then applied to the microprisms through a vacuum-deposition metallization process, and the temporary polyester carrier was then removed from the face of the film. For each sample, the coefficient of retroreflection was measured at an observation angle of 0.5 degrees for both a −4 degree and 30 degree entrance angle. These results are listed in Table 3. As can be seen from the data, in each example, the coefficient of retroreflection increases substantially, when the plane of optical axis tilting is rotated relative to the edge of the film.

TABLE 2

| Example | Polymeric Film of Microprism Layer | Polymeric Film(s) of Additional Layers |
|---|---|---|
| 2-A | 50 micron film of impact-modified polymethyl methacrylate, CA-1000 acrylic resin[1] | 100 micron film of impact-modified polymethyl methacrylate, Plexiglas DR acrylic resin[3] combined with a 75 micron UV-light screening outer-surface layer of acrylic polymers |
| 2-B | 50 micron film of impact-modified polymethyl methacrylate, CA-1000 resin[1] | 100 micron film of impact-modified polymethyl methacrylate, Plexiglas DR acrylic resin[3] combined with a 75 micron UV-light screening outer-surface layer of acrylic polymers |
| 2-C | 175 micron film of polycarbonate, SABIC 8010-DC[2] | 75 micron UV-light screening outer-surface layer of acrylic polymers |
| 2-D | 175 micron film of polycarbonate, SABIC 8010-DC[2] | 75 micron UV-light screening outer-surface layer of acrylic polymers |

[1]Available from Plaskolite West, Inc. of Compton, California, USA.
[2]Available from SABIC Polymershapes of Pittsfield, Massachusetts, USA.
[3]Available from Arkema, Inc. of King of Prussia, Pennsylvania, US

TABLE 3

| Example | Alignment of Plane of Optical Axis Tilting | Entrance Angle | Coefficient of Retroreflection (cd/lx/m²) |
|---|---|---|---|
| 2-A | 90° | −4° | 136.2 |
| | | 30° | 145.5 |
| 2-B | 45° | −4° | 304.9 |
| | | 30° | 197.7 |
| 2-C | 90° | −4° | 123.5 |
| | | 30° | 156.4 |
| 2-D | 45° | −4° | 291.2 |
| | | 30° | 189.5 |

EXAMPLE III

A flat embossing tool was prepared by tiling together a series of 13 mm wide strips of microprismatic tooling and then electroforming a nickel copy using techniques known in the art. The total area of the flat embossing tool was approximately 27 square-inches, and the tool was approximately 0.25 inches thick. The microprisms of the flat embossing tool were of the same forward-tilted microprism design as used on the cylindrical embossing tool of Example 2. The microprisms within each strip were aligned with plane of optical axis tilting either perpendicular to the edge of the tooling or rotated at approximately 45 degrees to the edge. The strips of tooling were assembled together in an alternating tiling pattern to create a single flat embossing tool where 50% of the microprisms were aligned with the plane of optical axis tilting at approximately a 45 degree angle to the edge of the tooling.

Several retroreflective film samples were prepared by embossing the tiled microprism array into a 175 micron film of Longhua PC-813 polycarbonate (available from Longhua Sichuan of China) using a heated laboratory platen press. The temperatures of the upper and lower platens were both set to 385° F. To protect the outer surface of the polycarbonate film, a sheet of 50 micron high-gloss polyester film was placed over the polycarbonate and a silicone rubber pad was placed over the polyester film. The pressure during embossing of the film was approximately 190 psi and the dwell time under heat and pressure was 45 seconds. The film was cooled using compressed air and the embossed polycarbonate film was then removed from the tool.

At this point, the microprisms of this polycarbonate retroreflective film operated through total internal reflection, and when viewed with a flash light, the samples were found to be visibly retroreflective. However, when viewed at a large entrance angle, as expected since the microprisms functioned through the principles of total internal reflection, the areas of the film containing the rotated microprisms were visibly less retroreflective than the areas with the microprisms aligned in a conventional alignment with the plane of optical axis tilting positioned perpendicular to the edge of the film sample.

The samples were then metalized with aluminum of greater than 99% purity to create the reflective coating on the lateral faces of the microprisms. Then, when viewed with a flashlight at wide entrance angles, the samples were found to have a visibly more uniform retroreflective appearance after metallization, notwithstanding the fact that approximately 50% of the microprisms were aligned in a traditionally unfavorable rotation. A coefficient of retroreflection of 152.6 cd/lx/m2 was measured at a 0.5 degree observation angle and a −4 entrance angle. This shows an improvement over the samples of Examples 2-A and 2-C, which do not incorporate any rotated microprisms. However, as would be expected, the coefficient of retroreflection is not as high as that of Examples 2-B or 2-D where all of the microprisms were aligned with the plane of optical axis tilting at approximately a 45 degree angle to the edge of the film. In comparison to Examples 2-A and 2-C, the fact that the coefficient of retroreflection of Example 3 was not slightly higher could be due to differences in the type of polymer used in Example 3 or due to differences between embossing with a flat tool versus a cylindrical tool.

Forward-tilted microprisms as provided by certain embodiments herein can have an optical axis tilt of greater than about 1.0 degree and typically up to about 20.0 degrees. However, for trihedral microprisms, defined by a triangular-shaped base plane, with a tilt angle greater than approximately 9.7 degrees, precision machining of the microprisms by ruling 3 parallel sets of V-shaped grooves may result in a portion of the microprisms being removed during the direct machining process. Hoopman, U.S. Pat. No. 4,588,258 and Szczech, U.S. Pat. No. 5,138,488 both provide more detailed descriptions of various designs of forward-tilted microprisms, which are incorporated herein by reference.

In certain embodiments, the height 27 of the forward-tilted microprisms, as measured from the base plane 22B to the apex 14B as shown in FIG. 3B, is typically between about 20 microns to about 275 microns. However, in one embodiment, the height is between about 35 microns to about 125 microns. At microprism heights greater than about 275 microns, in some instances, the resulting film product may become too stiff to be effectively rolled around a 3-inch packaging core commonly used in the industry.

Further, as is known in the art, tilted microprisms may exist in configurations where the base plane is not defined by a triangle. Light entering the prism in an active area will be reflected from the three lateral faces of the microprism and be returned towards the source. However, light entering inactive areas will only be reflected from only one or two of the lateral faces, and therefore, the light will not be returned towards the source. As such, ruling and assembly techniques have been developed to remove the inactive areas of individual microprisms to further increase the overall levels of retroreflection. In such instances, the base plane of such microprisms is no longer a triangle, but instead a different shape such as a square, rectangle, hexagon, or similar shape depending upon the ruling and assembly techniques used to remove at least some portion of the inactive areas. Such microprisms where all or a portion of the inactive area have been removed are known in the art as full-cube microprisms.

This disclosure further includes the possibility of aligning the plane of optical axis tilting of any such forward-tilted, full-cube microprisms at an angle θ with the edge of the film. Thus, for the purposes herein, a forward-tilted microprism will be defined to include such full-cube microprisms even if the base plane is not shaped as a triangle. In such instances, where the base plane is not a triangle, a forward-tilted microprism will be defined as any microprism, where if superimposed over a triangular base plane, the optical axis will be tilted directly towards one vertex of the superimposed base triangle.

The microprisms of the retroreflective film 30 of embodiments covered by this disclosure can be formed onto the substrate of the retroreflective film through any appropriate manufacturing processes. Such useful manufacturing processes include embossing of preformed films into a molding tool (such as the processes defined in Rowland, U.S. Pat. No. 4,244,683, or Pricone et al, U.S. Pat. No. 4,486,363, or Buoni et al, U.S. Pat. No. 6,375,776 B1), casting a fluid material into a molding tool (such as processes disclosed in Rowland, U.S. Pat. No. 3,689,346), extrusion embossing (such as the process defined in Mimura et al, U.S. Pat. No. 5,945,024), electrodeposition of polymeric powders into a molding tool (such as the process outlined in Pricone, U.S. Pat. No. 8,226,880 B1), all of which are incorporated here, or other known manufacturing techniques.

Useful molding tools for manufacturing the retroreflective film include discrete molding panels or continuous belts. Such tools may be formed by following a replication process in which an optical master containing the microprisms is repeatedly replicated and then the replicated copies are assembled together to form a larger tool or molding belt. The microprisms on the optical master may be formed by direct precision machining, such as through a diamond turning or diamond ruling process. Replicated copies may be made through electroforming processes, such as electrolytic nickel deposition, and then assembled together through laser welding or other known assembly techniques.

The retroreflective film may be formed as one integral film comprising a single light transmissible polymeric layer. Alternatively, the retroreflective film may consist of two or more light transmissible polymeric layers. The decision to incorporate only one or multiple polymeric layers will be dependent upon final product performance requirements such as durability, flexibility, impact strength, weatherability, solvent resistance, and similar performance criteria. For example, for extended outdoor durability and weatherability, it may be desirable to utilize a high-performing UV-light screening polymeric layer with exceptional weathering properties as the exposed, outer surface layer of the retroreflective film while a less durable but more cost effective layer is utilized to contain the microprisms. Similarly, it may be useful to incorporate a UV-light screening layer as the exposed outer surface layer of the retroreflective film to shield and to protect any pigments, dyes or other colorants utilized in a lower polymeric layer. Analogously, manufacturing cost or scrap considerations may also impact the decision to utilize only one or multiple transparent polymeric layers.

The total thickness combining all polymeric layers of the retroreflective film 40 is typically between 50 microns to 750 microns and more preferably between about 100 microns to about 400 microns. Retroreflective film with a total film thickness within this range has been found to provide the best balance of handling and performance properties relative to cost.

Regardless of whether the retroreflective film consists of only one layer of light transmissible polymeric material or multiple layers, it is typically desirable for the layer containing the microprisms to be formed from a relatively rigid polymeric material so that the microprisms will more readily retain their shape. The microprism layer can be made from many different light transmissible polymeric materials, including both thermoplastic polymers or reactive resin polymer systems.

Examples of thermoplastic polymers include acrylics such as polymethyl methacrylate and acrylic copolymers such as methyl-methacrylate/butyl-methacrylate copolymers; polycarbonate; polyester materials, such as polyethylene terephthalate (i.e. PET), and polyester copolymers, such as glycol-modified polyesters (e.g. PETG); polyvinyl chloride; polystyrene; polyarylate; cellulosics, such as cellulose acetate; epoxies; fluoropolymers such as polychlorofluoroethylene, or polyvinylidene fluoride; polyamides; polyetherketones; polyetherimide; polyolefins such as polymethylpentene; polysulfone; silicone modified polymers (i.e., polymers that contain a small weight percent (less than 10 weight percent) of silicone) such as silicone polyamide and silicone polycarbonate; fluorine modified polymers such as perfluoropolyethyleneterephthalate; and mixtures of the above polymers such as a blend of polyester and polycarbonate or a blend of a fluoropolymer and acrylic; and other light transmissible polymeric materials. Preferred materials include acrylic polymers and polycarbonate polymers due to their ease of processing and durability. Impact-modified acrylic polymers, such as DR-101 available from Arkema, Inc. of Philadelphia, Pa., or ZK-6 available from Evonik Cyro, LLC of Parsippany, N.J., are two examples of preferred acrylic polymers. An example of a preferred polycarbonate polymer is Lexan 101 available from SABIC Innovative Plastics of Pittsfield, Mass.

With reactive resin polymer systems, a reactive fluid material is typically cast onto a molding tool and then cured and hardened (i.e. cross-linked) through the use of radiation, such as electron beam curing or UV-light curing, to initiate a free-radical polymerization. Alternatively, the cross-linking can be initiated with heat with the addition of a catalyst such as benzoyl peroxide. Examples of resins that are capable of being polymerized by a free radical mechanism include acrylic-based resins derived from epoxies, polyesters, polyethers and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof.

In other embodiments, it may be desirable to create a flexible retroreflective film incorporating at least two different polymeric layers where the lower layer containing the microprisms consists of a relatively rigid polymeric (such as from the list above) while the outer layer consists of a relatively flexible layer to impart a greater level of flexibility to the overall reflective film product structure. Suitable light transmissible polymers to create the flexible layer include plasticized polyvinyl chloride as well as polyurethane polymers including both aliphatic and aromatic polyurethanes such as aliphatic polycarbonate urethane or aromatic polyester urethanes. Smith et al, U.S. Pat. No. 5,450,235 provides many more examples and a more detailed discussion of such multiple layer flexible retroreflective films, which is incorporated herein by reference.

Any of the layers of light transmissible polymeric material can contain one or more additives or colorants. Such additives include UV-light stabilizers including UV-light absorbers and hindered-amine light stabilizers, anti-oxidants, anti-static agents, anti-fungal additives, impact-modifiers or any other additives to enhance specific performance or processing properties. Colorants may include organic pigments, dyes, fluorescent colorants, and other materials. Any additive or colorant should itself be light transmissible when blended into the polymeric material to ensure that the polymeric material retains its light transmission properties. Additionally, an image or pattern may be printed on one or more of the polymeric layers.

The reflective coating 41 as provided by the embodiments herein are most typically a metallic coating and can be applied through a vapor-deposition process or a chemical-deposition process. It can consist of an aluminum, silver, nickel or other specularly reflective material. Most preferred reflective materials are high purity aluminum materials, such as 99.9% purity aluminum.

Those skilled in the art to which this application relates will appreciate that other and further additions, deletions, substitutions and modifications may be made to the described embodiments.

What is claimed is:

1. A metalized microprismatic retroreflective film, comprising:
   a substrate; and
   metalized microprisms located on said substrate, wherein at least a portion of said metalized microprisms are forward-tilted microprisms, and at least a portion of said forward-tilted microprisms are aligned with a plane of optical axis tilting aligned at an angle ranging from about 10 to 80 degrees with an edge of said microprismatic retroreflective film.

2. The metalized microprismatic retroreflective film of claim 1, wherein said substrate comprises an upper transparent layer and a lower layer containing the microprisms.

3. The metalized microprismatic retroreflective film of claim 1, wherein said plane of optical axis tilting is aligned at an angle from about 15 to about 75 degrees.

4. The metalized microprismatic retroreflective film of claim 1, wherein said plane of optical axis tilting is aligned at an angle from about 30 to about 60 degrees.

5. The metalized microprismatic retroreflective film of claim 1, wherein at least about 50% of said forward-tilted microprisms are aligned with said plane of optical axis tilting aligned at an angle from about 10 to about 80 degrees with said edge of said metalized microprismatic retroreflective film.

6. The metalized microprismatic retroreflective film of claim 1, wherein said metalized microprismatic retroreflective film further comprises at least two different tiling arrays of metalized microprisms in a parquetted pattern.

7. The metalized microprismatic retroreflective film of claim 6, wherein said metalized microprisms within each tiling array are aligned with said plane of optical axis tilting aligned at different angles relative to said edge of said microprismatic retroreflective film.

8. The metalized microprismatic retroreflective film of claim 1, wherein a tilt angle of said forward-tilted microprisms is from about 1.0 degrees to about 20 degrees.

9. The metalized microprismatic retroreflective film of claim 8, wherein said tilt angle of said forward-tilted microprisms is from about 1.0 degrees to about 9.7 degrees.

10. The metalized microprismatic retroreflective film of claim 1, wherein a height of said forward-tilted microprisms is from about 25 microns to about 275 microns.

11. The metalized microprismatic retroreflective film of claim 10, wherein said height is from about 35 microns to about 125 microns.

12. The metalized microprismatic retroreflective film of claim 1, wherein said metalized microprisms are comprised of an acrylic or polycarbonate polymeric material.

13. The metalized microprismatic retroreflective film of claim 1, wherein said metalized microprisms are coated with a reflective metal coating.

14. The metalized microprismatic retroreflective film of claim 13, wherein said reflective metal coating is comprised of nickel, aluminum, or silver.

15. A method of fabricating a metalized microprismatic retroreflective film, comprising:
    placing metalized microprisms on a substrate, said microprisms having a reflective coating thereon, and wherein at least a portion of said metalized microprisms are forward-tilted microprisms, and at least a portion of said forward-tilted microprisms are aligned with a plane of optical axis tilting aligned at an angle ranging from about 10 to about 80 degrees with an edge of said metalized microprismatic retroreflective film;
    bonding an adhesive layer to said reflective coating; and
    attaching a release liner to said adhesive layer.

16. The method of claim 15, wherein said plane of optical axis tilting is aligned at an angle from about 15 to about 75 degrees.

17. The method of claim 15, wherein said plane of optical axis tilting is aligned at an angle from about 30 to about 60 degrees.

18. The method of claim 16, wherein at least 50% of said forward-tilted microprisms are aligned with said plane of optical axis tilting aligned at an angle from about 10 to about 80 degrees with said edge of said substrate.

19. The method of claim 15, wherein said microprismatic retroreflective film further comprises at least two different tiling arrays of metalized microprisms in a parquetted pattern, wherein said metalized microprisms within each tiling array are aligned with said plane of optical axis tilting aligned at different angles relative to said edge of said metalized microprismatic retroreflective film.

* * * * *

UNITED STATES PATENT AND TRADEMARK OFFICE
CERTIFICATE OF CORRECTION

PATENT NO. : 9,529,125 B2
APPLICATION NO. : 14/761522
DATED : December 27, 2016
INVENTOR(S) : Drew J. Buoni It is certified that error appears in the above-identified patent and that said Letters Patent is hereby corrected as shown below:

In the Specification

Column 6, Line 25, after "15G, 15H, and" delete "151" and insert --15I--

Column 6, Line 29, after "19B of edge" delete "151" and insert --15I--

Signed and Sealed this
Twentieth Day of February, 2018

Andrei Iancu
*Director of the United States Patent and Trademark Office*